(12) United States Patent
Abend et al.

(10) Patent No.: US 7,445,077 B2
(45) Date of Patent: Nov. 4, 2008

(54) AXLE DRIVING UNIT FOR A LAWN TRACTOR

(75) Inventors: Robert Abend, Adairsville, GA (US); Norihiro Ishii, Amagasaki (JP); Ryota Ohashi, Hyogo-ken (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 0 days.

(21) Appl. No.: 11/620,962

(22) Filed: Jan. 8, 2007

(65) Prior Publication Data

US 2007/0107951 A1  May 17, 2007

Related U.S. Application Data

(63) Continuation of application No. 11/254,746, filed on Oct. 21, 2005, which is a continuation of application No. 10/847,372, filed on May 18, 2004, now Pat. No. 6,983,815, which is a continuation of application No. 10/187,848, filed on Jul. 3, 2002, now Pat. No. 6,752,236, which is a continuation of application No. 10/101,071, filed on Mar. 20, 2002, now Pat. No. 6,568,498, which is a continuation of application No. 08/875,724, filed as application No. PCT/US95/04097 on Mar. 30, 1995, now Pat. No. 6,390,227.

(51) Int. Cl.
*B60K 17/00* (2006.01)

(52) U.S. Cl. ............... 180/305; 74/606 R; 180/306; 180/307; 180/374; 180/377; 180/383

(58) Field of Classification Search ........... 180/375, 180/370, 374, 376, 377, 378, 383, 305, 306, 180/307; 74/606 R See application file for complete search history.

(56) References Cited

U.S. PATENT DOCUMENTS 2,417,613 A   3/1947 Radabaugh (Continued)

FOREIGN PATENT DOCUMENTS

GB   992004   *  3/1963

(Continued)

OTHER PUBLICATIONS

Co-pending U.S. Appl. No. 11/688,558 to Abend et al., filed Mar. 20, 2007.

(Continued)

*Primary Examiner*—Eric Culbreth
(74) *Attorney, Agent, or Firm*—Sterne, Kessler, Goldstein & Fox, P.L.L.C.

(57) ABSTRACT

An axle driving apparatus for a vehicle includes an axle, a vertical pump shaft, a hydraulic pump having a movable swash plate, a pair of trunnion shafts provided coaxially at respective opposite sides of the movable swash plate, a hydraulic motor having a motor shaft drivingly connected to the axle, and a housing containing the hydraulic pump, the hydraulic motor, and the axle. The housing includes a first housing member and a second housing member separably jointed along a vertical plane perpendicular to a rotary axis of the axle. A rotary axis of the hydraulic pump is substantially parallel to the vertical plane. The hydraulic pump is entirely disposed in the first housing member. A rotary axis of the trunnion shafts is substantially perpendicular to the vertical plane. One of the trunnion shafts is rotatably supported by the first housing member and the other of the trunnion shafts is rotatably supported by the second housing member, whereby the movable swash plate is slantingly rotatably supported in the housing.

28 Claims, 31 Drawing Sheets

U.S. PATENT DOCUMENTS

| | | | |
|---|---|---|---|
| 2,608,261 A | 8/1952 | Blazier |
| 3,191,447 A | 6/1965 | Ollman |
| 3,332,323 A | 7/1967 | Roeske |
| 3,587,238 A | 6/1971 | Molly |
| 3,969,876 A | 7/1976 | Turos |
| 4,304,141 A | 12/1981 | Tone et al. |
| 4,756,208 A | 7/1988 | Hayashi et al. |
| 4,781,259 A | 11/1988 | Yamaoka et al. |
| 4,796,722 A | 1/1989 | Kumagai |
| 4,809,796 A | 3/1989 | Yamaoka et al. |
| 4,819,508 A | 4/1989 | Yamaoka et al. |
| 4,835,951 A | 6/1989 | Walker |
| 4,856,264 A | 8/1989 | Nishimura et al. |
| 4,870,820 A | 10/1989 | Nemoto |
| 4,891,943 A | 1/1990 | Okada |
| 4,899,525 A | 2/1990 | Takei et al. |
| 4,903,545 A | 2/1990 | Louis et al. |
| 4,909,365 A | 3/1990 | Tillotson et al. |
| 4,914,907 A | 4/1990 | Okada |
| 4,922,787 A | 5/1990 | Fujisaki et al. |
| 4,932,209 A | 6/1990 | Okada et al. |
| 4,942,780 A | 7/1990 | Fujisaki et al. |
| 4,953,426 A | 9/1990 | Johnson |
| 4,962,675 A | 10/1990 | Aoi et al. |
| 5,078,222 A | 1/1992 | Hauser et al. |
| 5,094,078 A | 3/1992 | Nishimura et al. |
| 5,127,215 A | 7/1992 | Wenzel |
| 5,142,940 A | 9/1992 | Hasegawa |
| 5,201,692 A | 4/1993 | Johnson et al. |
| 5,259,194 A | 11/1993 | Okada |
| 5,317,936 A | 6/1994 | Shiba et al. |
| 5,335,496 A | 8/1994 | Azuma et al. |
| 5,339,631 A | 8/1994 | Ohashi |
| 5,392,670 A | 2/1995 | Hauser |
| 5,400,594 A | 3/1995 | Hayens |
| 5,412,947 A | 5/1995 | Hirose |
| 5,440,951 A | 8/1995 | Okada et al. |
| 5,456,068 A | 10/1995 | Ishii et al. |
| 5,560,447 A | 10/1996 | Ishii et al. |
| 5,613,409 A | 3/1997 | Hauser |
| 5,626,204 A | 5/1997 | Johnson |
| 5,636,555 A | 6/1997 | Okada et al. |
| 5,755,098 A | 5/1998 | Irikura |
| 5,894,907 A | 4/1999 | Peter |
| 5,918,691 A | 7/1999 | Ishii et al. |
| 5,980,416 A | 11/1999 | Gafvert |
| 6,038,840 A | 3/2000 | Ishimori |
| 6,105,463 A | 8/2000 | Sporrer |
| 6,125,630 A | 10/2000 | Abend et al. |
| RE37,049 E | 2/2001 | Ishii et al. |
| 6,260,339 B1 | 7/2001 | Abend et al. |
| 6,385,971 B1 | 5/2002 | Abend et al. |
| 6,390,227 B1 | 5/2002 | Abend et al. |
| 6,467,265 B1 | 10/2002 | Abend et al. |
| 6,550,242 B2 | 4/2003 | Abend et al. |
| 6,568,498 B2 | 5/2003 | Abend et al. |
| 6,571,555 B2 | 6/2003 | Abend et al. |
| 6,648,095 B2 | 11/2003 | Abend et al. |
| 6,705,080 B2 | 3/2004 | Abend et al. |
| 6,745,864 B2 | 6/2004 | Abend et al. |
| 6,752,236 B2 | 6/2004 | Abend et al. |
| 6,983,815 B2 | 1/2006 | Abend et al. |
| RE39,255 E | 9/2006 | Ishii et al. |
| 7,121,093 B2 | 10/2006 | Abend et al. |
| 2006/0064958 A1 | 3/2006 | Abend et al. |
| 2007/0163254 A1 | 7/2007 | Abend et al. |

FOREIGN PATENT DOCUMENTS

| | | |
|---|---|---|
| GB | 2254665 * | 10/1992 |
| JP | 05-193379 | 8/1993 |
| JP | 06-255383 | 9/1994 |

OTHER PUBLICATIONS

Hydrostatic Transaxle Models 751, 771, 781, and 851, online at http://hydraulics.eaton.com/products/pdfs/11-04-888.pdf, Eaton Corporation.

Hydrostatic Transaxle Models 778 Right Angle Transaxle, online at http://hydraulics.eaton.com/products/pdfs/11-701.pdf, Eaton Corporation, dated Aug. 1998.

* cited by examiner

AXLE DRIVING UNIT FOR A LAWN TRACTOR

CROSS-REFERENCE TO RELATED APPLICATIONS

This application is a continuation of U.S. application Ser. No. 11/254,746, filed Oct. 21, 2005, which is a continuation of U.S. application Ser. No. 10/847,372, filed May 18, 2004, now U.S. Pat. No. 6,983,815, which is a continuation of U.S. application Ser. No. 10/187,848, filed Jul. 3, 2002, now U.S. Pat. No. 6,752,236, which is a continuation of U.S. application Ser. No. 10/101,071, filed Mar. 20, 2002, now U.S. Pat. No. 6,568,498, which is a continuation of U.S. application Ser. No. 08/875,724, filed Aug. 4, 1997, now U.S. Pat. No. 6,390,227, which is a National Stage of PCT International No. PCT/US95/04097, filed Mar. 30, 1995, the entire disclosures of which are incorporated herein by reference.

BACKGROUND OF THE INVENTION

1. Field of the Invention

The present invention relates to an axle driving unit suitable for use with a rear-discharge lawn tractor having a mower located beneath the body of the tractor between the front and rear wheels.

2. Related Art

U.S. Pat. No. 3,969,876 discloses a conventional lawn tractor having a rear discharge system, which has a mower driven by a prime mover mounted on it, and a leaf blower loaded on the rear portion of the tractor. The rear discharge system disposes a chute, for discharging lawn grass cut by the mower, longitudinally between the left and right rear wheels. The rear discharge system has no projection to the outside of the body of the tractor. The cut lawn grass is discharged directly rearwardly of the tractor. This has the advantage of eliminating equipment, such as an auxiliary suction fan.

However, because the space between the left and right rear wheels is very narrow, it is very difficult to laterally juxtapose therebetween the cut grass chute and an axle driving apparatus. As disclosed in U.S. Pat. No. 3,969,876, a hydraulic stepless speed change transmission and a differential gear constituting the axle driving unit are separated and are housed in separate housings. The differential gear is disposed in the narrow space between the wheels, and the transmission is disposed at another position on the body of the tractor. The output shaft of the hydraulic stepless speed change transmission and differential gear are connected by a chain belt mechanism. Accordingly, the axle driving unit has the disadvantages of a high manufacturing cost and a long assembly time. Also, since one axle, through which the cut grass chute passes, is much longer than the other axle, this design has the further disadvantage that the one longer axle is easy to deflect. Accordingly, the lifespan of a bearing for the one longer axle provided at the differential gear is reduced.

An axle driving unit which houses in a common housing a hydraulic stepless speed change transmission and a differential gear for differentially connecting a pair of axles and integrates them is well-known, as disclosed in, for example, U.S. Pat. No. 4,914,907 and No. 4,932,209. In these patents, the transmission comprises a combination of a variable displacement type hydraulic pump and a fixed displacement hydraulic motor. The hydraulic pump and motor are mounted side by side and longitudinally of the axle with respect to an L-like-shaped center section, whereby the entire axle driving unit is larger in width longitudinally of the axle. Hence, the axle driving unit of this design interferes with the chute of a lawn tractor which has a rear discharge system. As a result, the chute cannot be disposed between the left and right rear wheels.

SUMMARY OF THE INVENTION

The axle driving unit of the present invention is constructed so that a first shorter axle that mounts a first driving wheel, and a second longer axle that mounts a second driving wheel are supported by a housing provided on a body frame. The housing is attached to the tractor body frame so that it is eccentric or offset to be in proximity to the first driving wheel. The housing is provided with an enlarged region extending forward at approximately a right angle with respect to the axles. A hydraulic stepless speed change transmission is provided in the enlarged region. As a result, the axle driving unit of the present invention can be easily disposed laterally of (or to the side of) the chute of a lawn tractor of the rear discharge type.

In order to improve the operating efficiency of the hydraulic stepless speed change transmission, it is desirable to construct the transmission so that it is a hydraulic stepless system fluidly connecting the hydraulic pump and hydraulic motor to each other. In this case, the hydraulic pump can be disposed in the enlarged region, smaller in width and spaced apart from the axle, and the hydraulic motor can be disposed in proximity to the axle.

In the enlarged region are provided a pump mounting surface and a motor mounting surface disposed substantially perpendicular or rectangular with respect to each other for mounting the hydraulic pump and hydraulic motor. It is preferable that the hydraulic pump is mounted onto the pump mounting surface so that an input shaft connected to the hydraulic pump is oriented approximately vertically with respect to the axles, and the hydraulic motor is mounted onto the motor mounting surface so that an output shaft connected to the hydraulic motor is oriented approximately horizontally with respect to the axles. In a lawn tractor that includes a prime mover having a vertical crankshaft, the input shaft of the transmission can be connected therewith by use of a simple belt transmitting mechanism. The output shaft of the transmission can be connected with the axle by use of an inexpensive spur gear having a low manufacturing cost.

Bearing means are provided in the housing for supporting the first and second axles. A pair of bearing holding portions for supporting distal portions of the first and second axles define the width of the housing to be smaller than the length of the housing including the enlarged region. As a result, the enlarged region is elongated so that the chute can have as large a cross-sectional area as possible.

It is desirable that the second longer axle be supported at an intermediate portion thereof by a bearing device provided on the tractor body frame. As a result, the second longer axle is stably supported. It is also desirable that the second axle be composed of at least two axle parts separably connected with each other through a coupling. Hence, the axle driving unit becomes superior in assembly efficiency and transformation efficiency. The axle to which the other (first) driving wheel is mounted is stably supported by a bearing device provided on the tractor body frame.

The above and further objects and novel features of the invention will more fully appear from the following detailed description when the same is read in connection with the accompanying drawings.

DETAILED DESCRIPTION OF THE PREFERRED EMBODIMENTS

Figure 1:
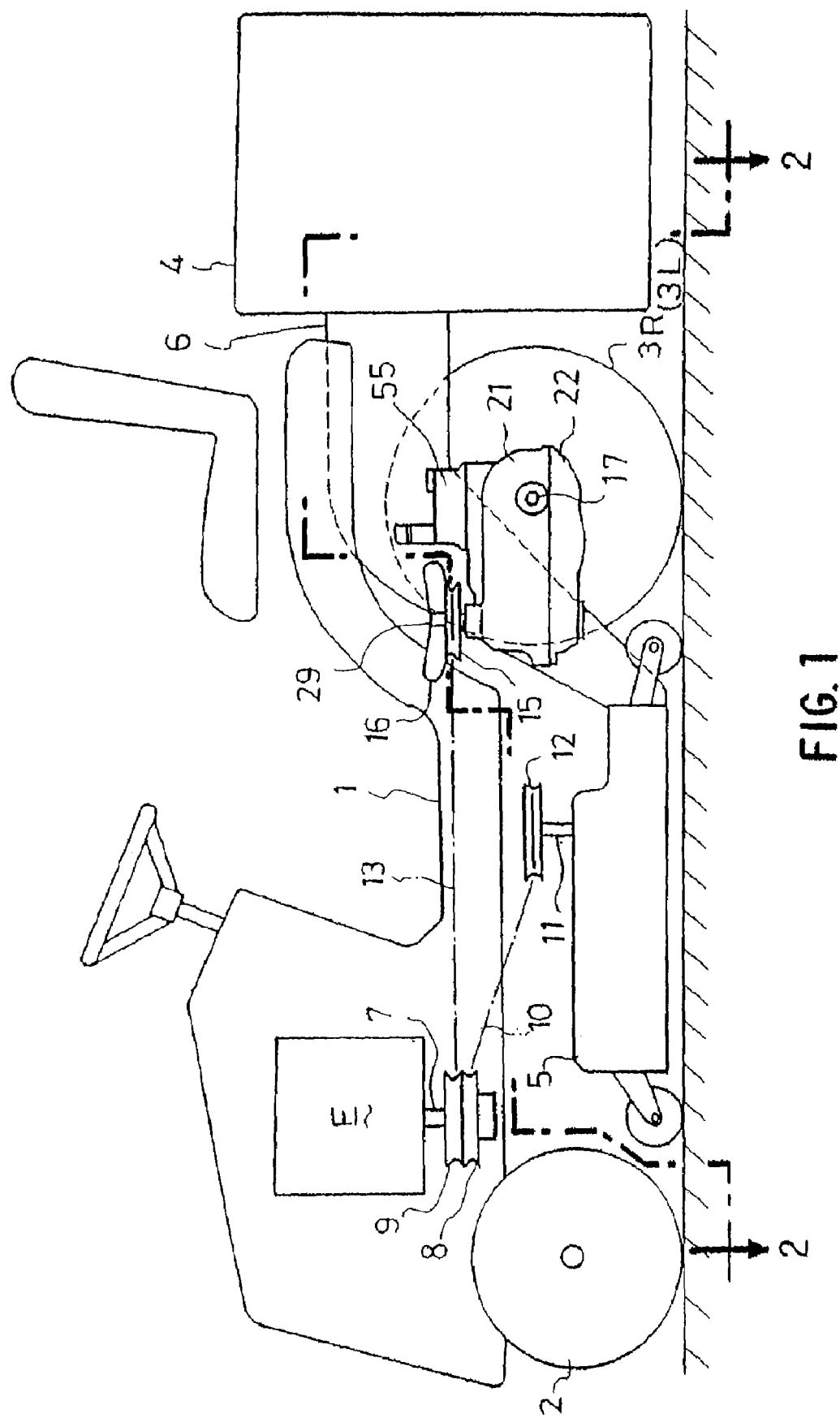
FIG. 1 a side view of a lawn tractor of the present invention.
Figure 2:
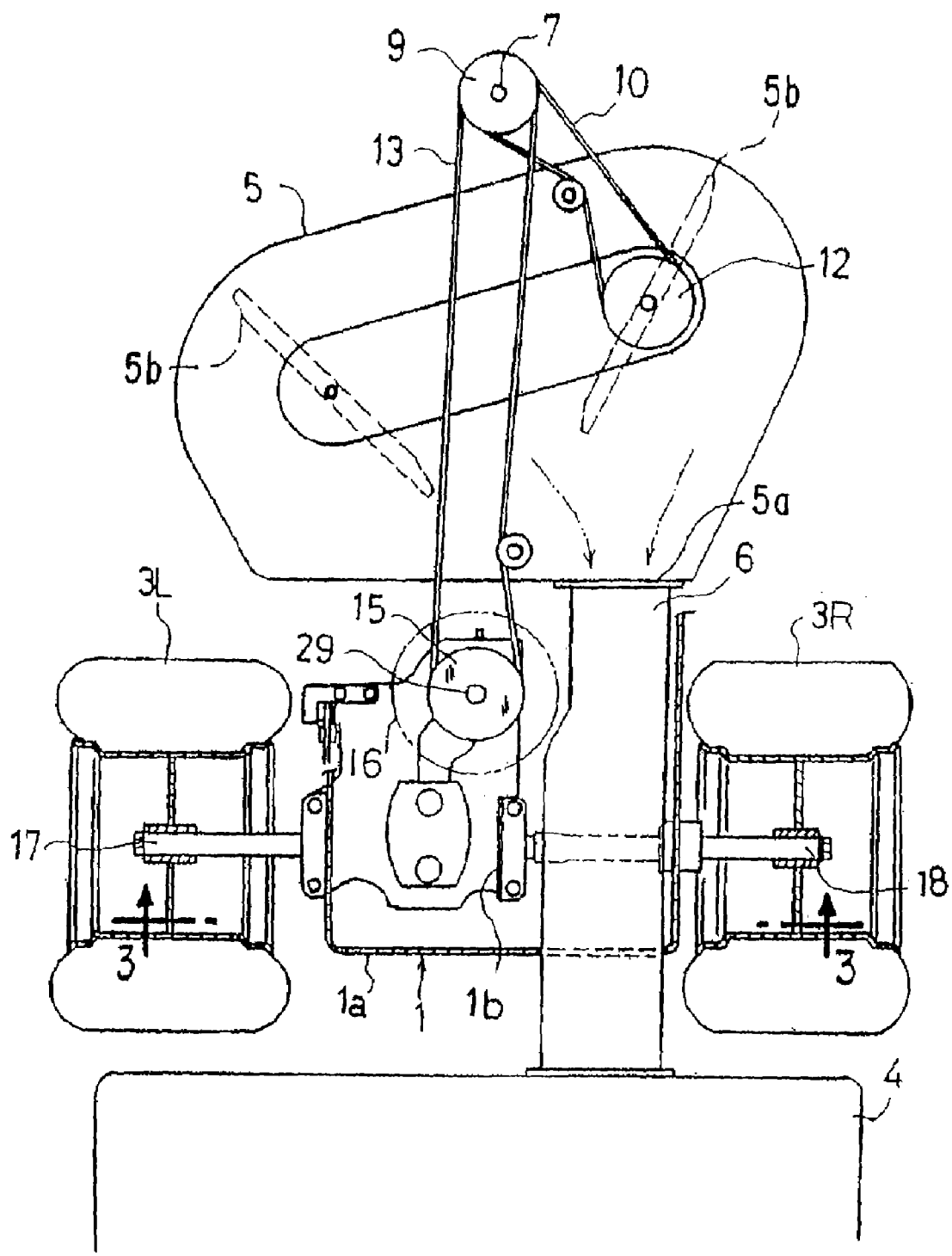
FIG. 2 is a cross sectional view of the lawn tractor of FIG. 1 taken along line 2-2.
Figure 3:
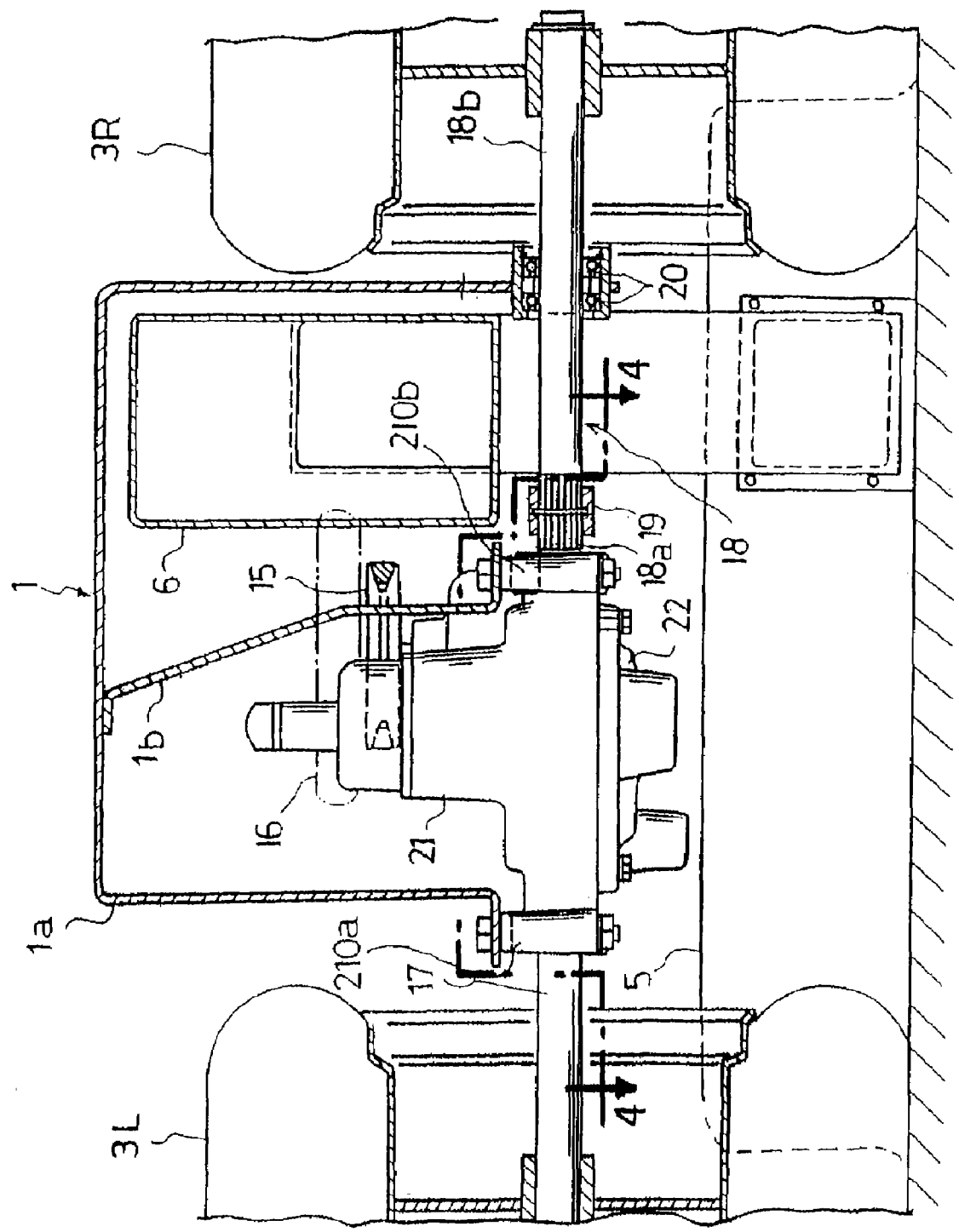
FIG. 3 is a cross sectional view taken along line 3-3 in FIG. 2.

In the following description of the various embodiments, description of parts designated with the same reference numerals will not be repeated, unless specifically noted otherwise. In FIGS. 1 through 3, a lawn tractor of the present invention is so constructed that an engine E is loaded on the front of a body frame 1, and left and right freely steerable driven (or front) wheels 2 are suspended under the front of the body frame. An axle driving unit provided with left and right driving (or rear) wheels 3L and 3R is suspended at the rear of body frame 1. A grass catcher 4 is mounted to the rear end of body frame 1, and a mower 5 is attached beneath the body of the tractor between the front and rear wheels through an elevation device (not shown). Mower 5 is connected at a rear discharge port 5a thereof with an inlet port of catcher 4 through a chute 6. Chute 6 extends slantwise upwardly from the rear discharge port 5a of the mower 5, passes laterally or to the side of the axle driving unit and between the left and right rear driving wheels 3L and 3R, and is connected to the inlet of catcher 4. Accordingly, lawn grass cut by mower 5 is blown rearwardly to pass between left and right rear driving wheels 3L and 3R through chute 6, and is then stored in catcher 4. The lawn tractor preferably includes a height-adjustable seat that can be raised and lowered.

As shown in FIG. 1, two pulleys 8 and 9 are fixed onto an output shaft 7 of engine E. Pulley 8 transmits a driving force through a belt 10 to a third pulley 12 fixed onto an input shaft 11 of mower 5, thereby rotating cutter blades 5b of mower 5 (see FIG. 2). The other pulley 9 is adapted to transmit a driving force through a belt 13 to a fourth pulley 15 fixed onto a pump shaft or input shaft 29, projecting upwardly from a housing for the axle driving unit. Reference numeral 16 designates a cooling fan fixed to pulley 15 in order to cool the axle driving unit.

As shown in FIG. 3, the axle driving unit is suspended from a first mounting member 1a and a second mounting member 1b, both parts of body frame 1. The axle driving unit is eccentrically disposed toward one of the two sides of body frame 1. FIG. 3 shows the axle driving unit disposed in a position displaced toward driving wheel 3L relative to the center of the space between left and right driving wheels 3L and 3R. The left side of the housing of the axle driving unit is fixed to first mounting member 1a, and the right side to second mounting member 1b that downwardly extends from a laterally intermediate portion of first mounting member 1a. As shown in FIG. 3, body frame 1 of the tractor includes first mounting member 1a provided longitudinally of body frame 1 and at a portion adjacent to the inside of driving wheel 3L. The second mounting member 1b is suspended from about the center of the space between driving wheels 3L and 3R. A bearing 20 is provided at a portion of body frame 1 adjacent to the inside of driving wheel 3R.

The housing for the axle driving unit comprises an upper half housing 21 and a lower half housing 22 joined to each other through a peripheral joint or junction surface. When the housing is mounted in an operating position on body frame 1 of the tractor, the joint surface is substantially horizontally disposed.

Shorter first axle 17 projects from the left side of the housing for the axle driving unit, and longer second axle 18 projects from the right side of the housing. Driving wheel 3L mounts at one axial end of first axle 17, and driving wheel 3R mounts at one axial end of second axle 18.

A first mounting boss 210a is formed at a portion of the axle driving unit housing positioned near the distal portion (portion closest to the axle driving unit) of first axle 17, and a second mounting boss 210b is formed at the portion of the housing positioned near the distal portion of second axle 18.

First mounting member 1a is connected to first mounting boss 210a, and second mounting member 1b is connected to second mounting boss 210b. Thus, the housing is eccentrically mounted in the working or operating position, offset to one side toward driving wheel 3L. Such a layout ensures a sufficiently wide space between the axle driving unit housing and driving wheel 3R so that chute 6 can be offset from the center of the tractor body. As a result, the axle driving unit and chute 6 can be arranged laterally, side by side of each other within body frame 1. This enables chute 6 to longitudinally extend within body frame 1.

Second axle 18 is supported at the distal portion thereof (18a) by the housing, and at an intermediate portion of a longer portion (18b) projecting outwardly from the housing by a bearing 20. Hence, the distance between the bearing for supporting the distal portion of first axle 17 and that for supporting the distal portion of second axle 18 can be greatly reduced, thereby reducing the width W of the axle driving unit housing. Consequently, chute 6 can be designed with a relatively increased cross-sectional area.

Alternatively, second axle 18 may be formed as one long axle. However, it is favorable for assembly of the axle driving unit and facilitation of transportation to divide axle 18 into part 18a supported at the housing, and part 18b supported by bearing 20, as shown in FIG. 3. Parts 18a and 18b are connected by a coupling 19.

Figure 8:
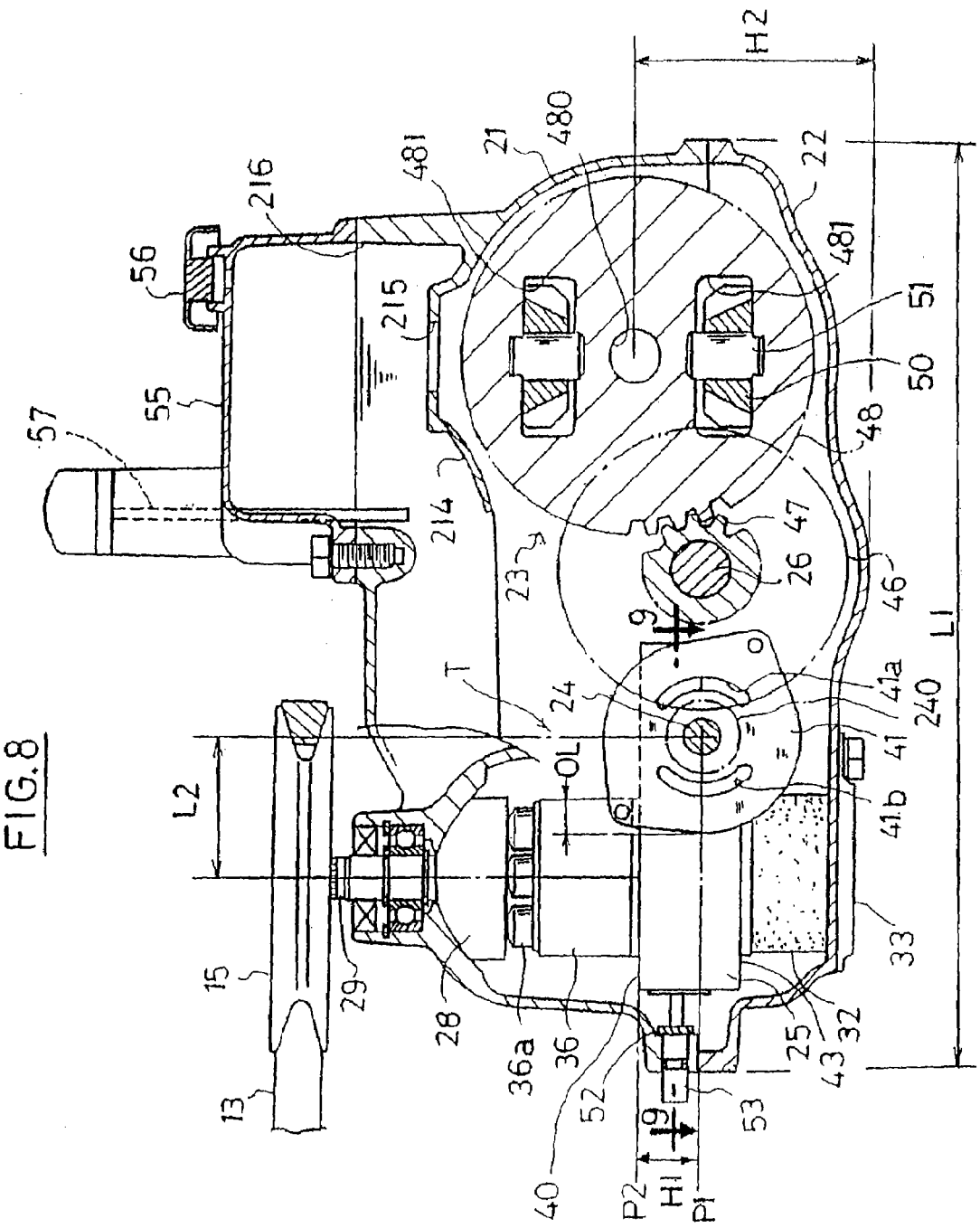
FIG. 8 is a sectional view taken on the line 8-8 in FIG. 4.
Figure 9:
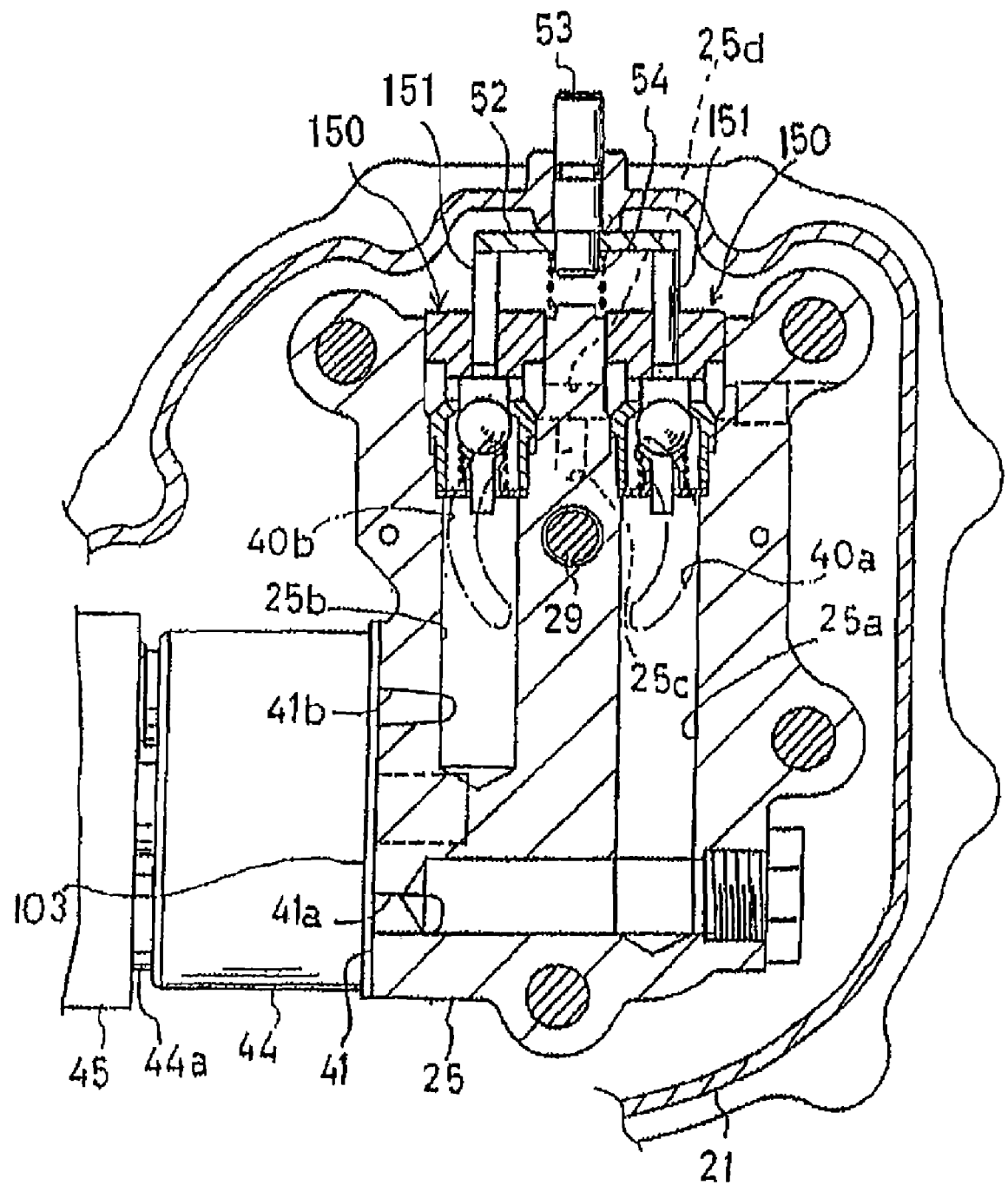
FIG. 9 is a sectional view taken on the line 9-9 in FIG. 8.
Figure 10:
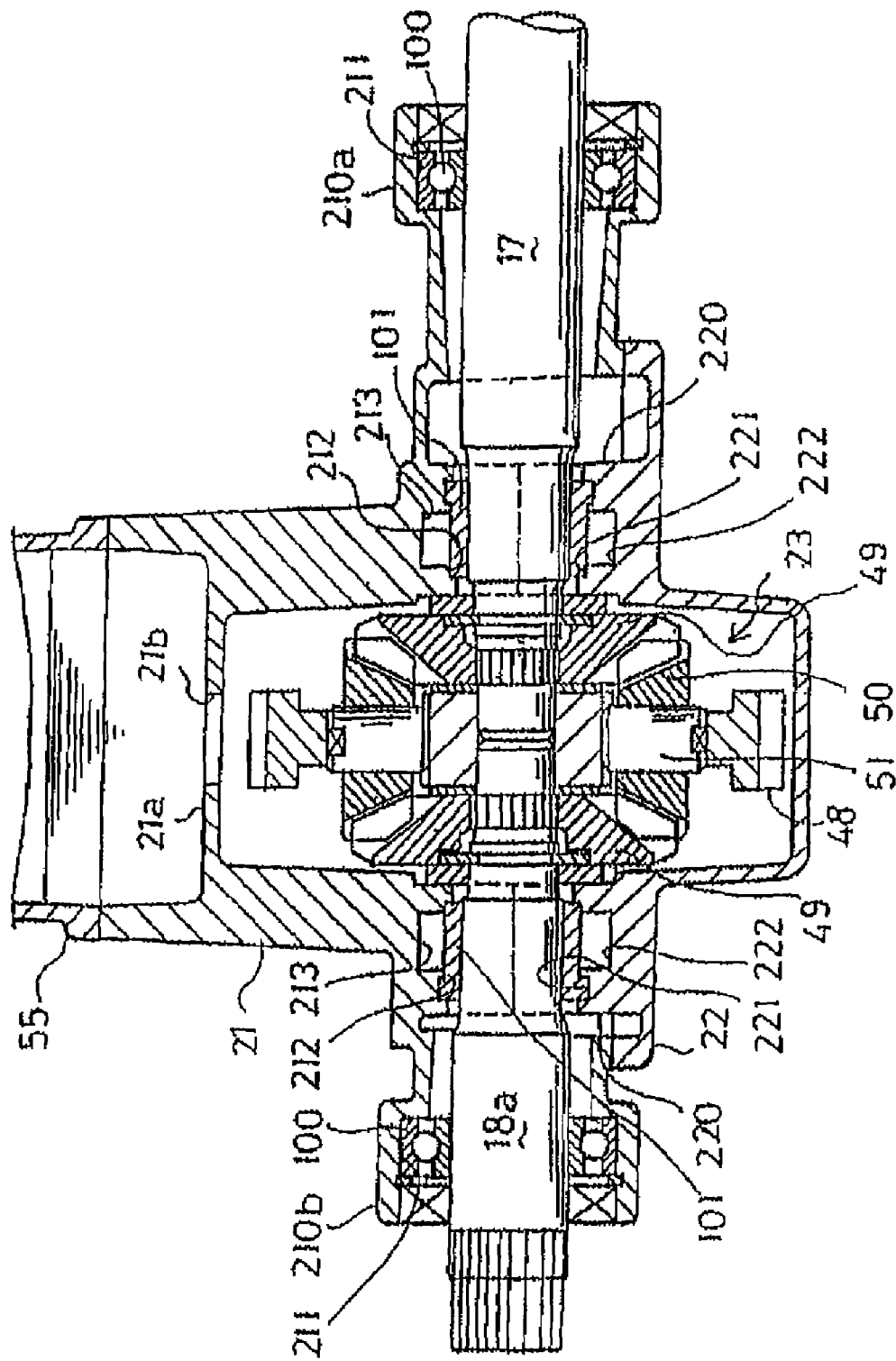
FIG. 10 is a sectional view taken on the line 10-10 in FIG. 4.

FIGS. 4-11 show the construction of an axle driving unit for speed-change-driving rear driving wheels 3L and 3R. The housing of the axle driving unit is formed by connecting upper half housing 21 and lower half housing 22 with each other. Lubricating oil is charged into the housing; and is used as operating oil for a hydraulic stepless speed change transmission T to be discussed below. First axle 17 and part 18a of the second axle are rotatably supported in upper half housing 21 positioned above the joint surface. As shown in FIG. 10, cylindrical bores 211 are formed at left and right side walls of upper half housing 21 to form first bearing supports, respectively. Rolling bearings 100 fitted into cylindrical bores 211 support the distal portion of first axle 17 and part 18a of second axle 18, cylindrical bores 211 being closed at their outer ends with oil seals.

As best seen in FIG. 10, semicircular concave circular-arc surfaces 212 are formed on the inner surface of an upper wall of upper half housing 21. On the inner surface of lower half housing 22 are integrally formed projections 220 that project beyond the joint surface. Semicircular concave circular-arc surfaces 221 are formed at the end surfaces of projections 220 that are positioned opposite to concave surfaces 212, respectively, to form a pair of second bearing holders. Bushings 101 are inserted into the second bearing holders, so that bushings 101 support the base ends of first axle 17 and part 18a of second axle 18, respectively.

As shown in FIG. 10, concave circular-arc surfaces 213 larger in radius than surfaces 212 are formed in upper half housing 21 from concave circular-arc surfaces 212, and concave circular-arc surfaces 222 larger in radius than surfaces 221 are formed in lower half housing 22 from concave circular-arc surfaces 221. Concave circular-arc surfaces 213 and 222 are combined to form annular cavities. Rolling bearings (not shown) may be built-in to the cavities, instead of the aforesaid bushings 101, to support the base ends of first and second axles 17 and 18. The choice of bushings or bearings depends upon the size of the load applied to axles 17 and 18. When the load is small, bushings 101, as shown in the embodiment of FIG. 10, are used to reduce manufacturing cost. When the load is large, the rolling bearings (not shown) are used to increase the support strength for the axles.

As shown in FIG. 10, first axle 17 and part 18a of second axle 18 abut concentrically against each other in the housing, differentially connected to each other by a differential gear 23 contained in the housing. Axle 17 and part 18a of axle 18 project laterally outwardly from the housing.

As best seen in FIGS. 8 and 10, an input gear 48 larger in width than differential gear 23 has at the center a through-bore 480. The base ends of first axle 17 and part 18a of second axle 18 are inserted into through-bore 480 to be supported by input gear 48. Bevel gears 49, spline-engaged with first axle 17 and part 18a of second axle 18, and input gear 48 prevent axial movement of the axles. Pinions 50 engageable with bevel gears 49, and through-bores 481 for containing therein pivotal pins 51 for pinions 50, are provided at both sides of input gear 48. A flat portion formed at the circumferential surface of the end of each pivotal pin 51 abuts against a flat portion provided at each through-bore 481, thereby restraining each pivotal pin 51 from rotating. Accordingly, differential gear 23 is formed from a smaller number of parts.

Figure 11:
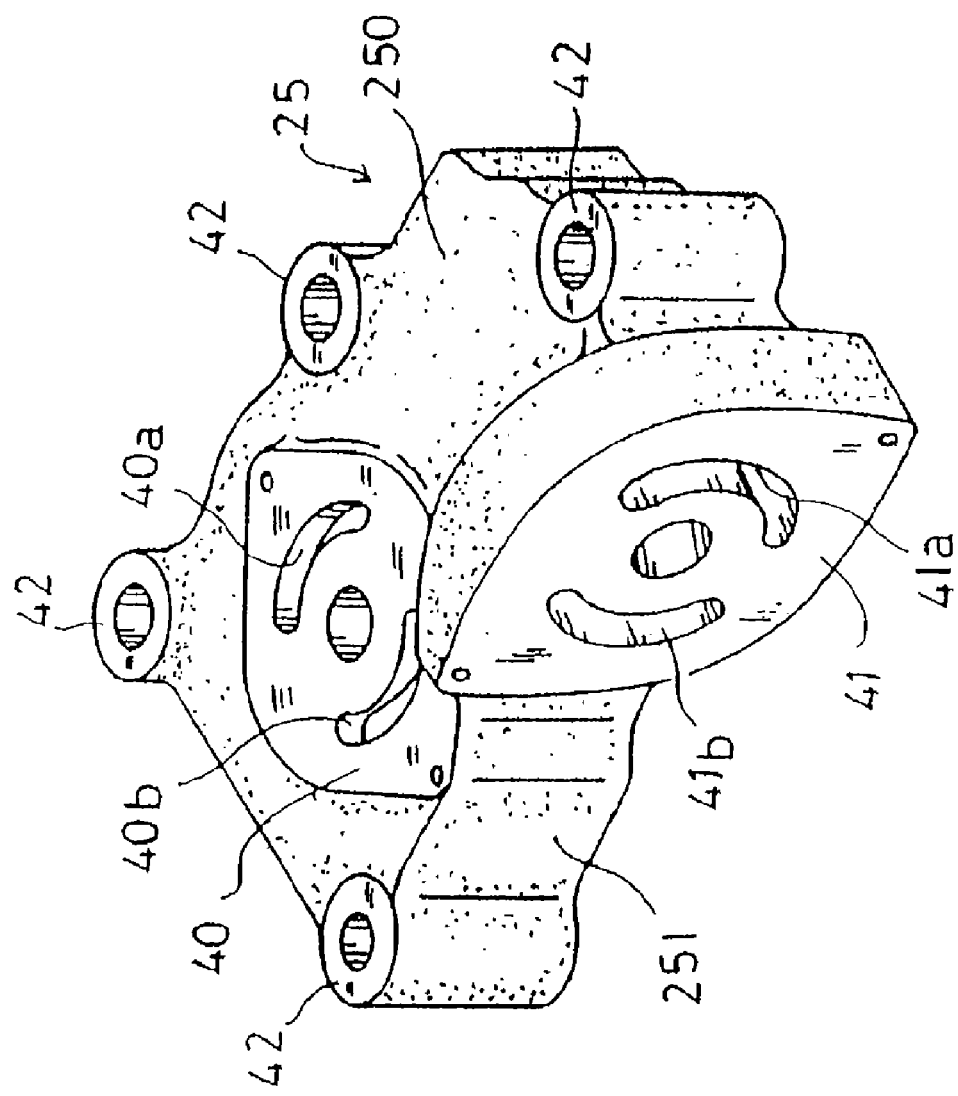
FIG. 11 is a perspective view of a center section of the present invention.
Figure 12:
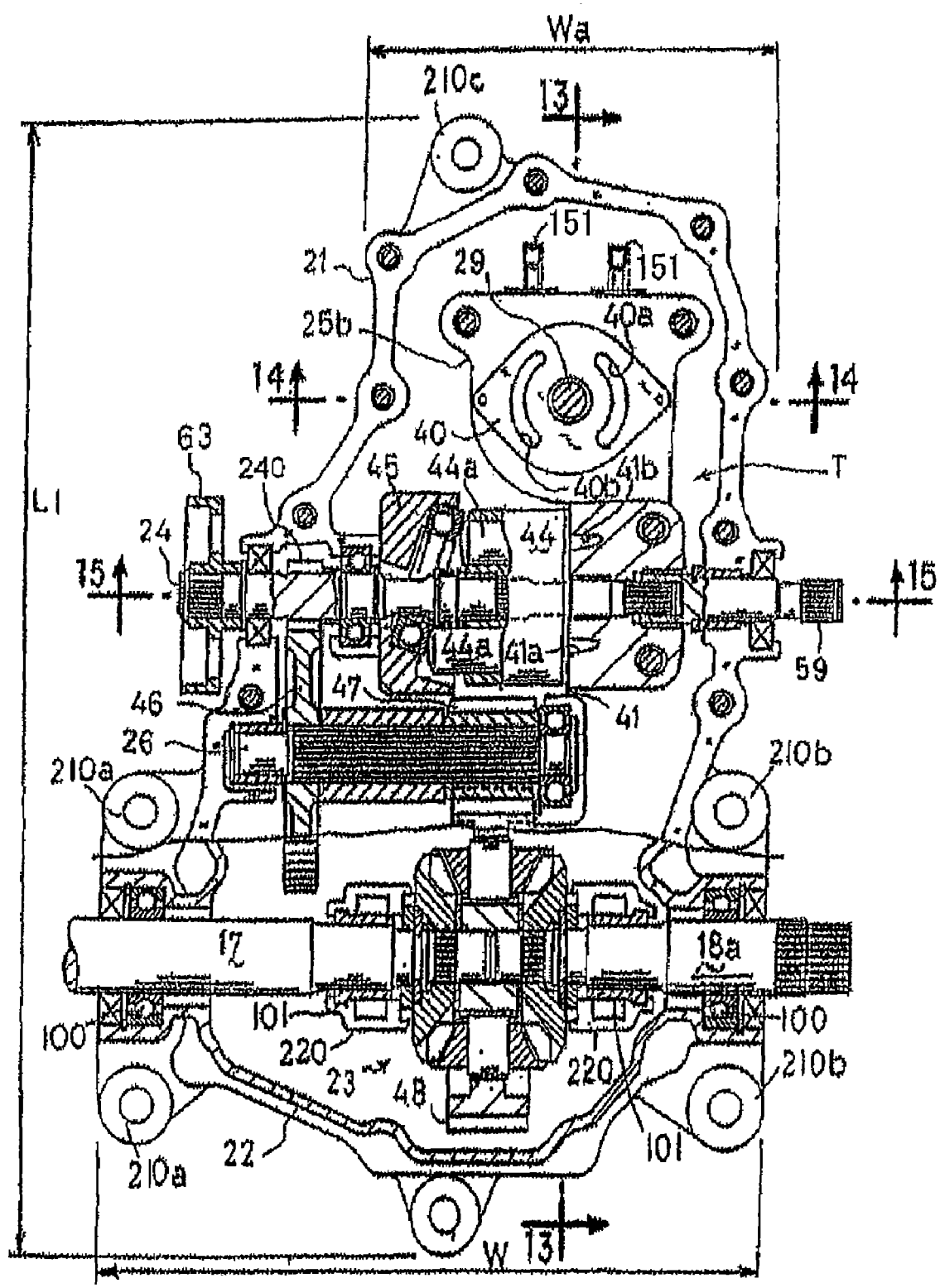
FIG. 12 is a partially sectional plan view of a second embodiment of the axle driving unit, from which an upper half housing is removed.
Figure 13:
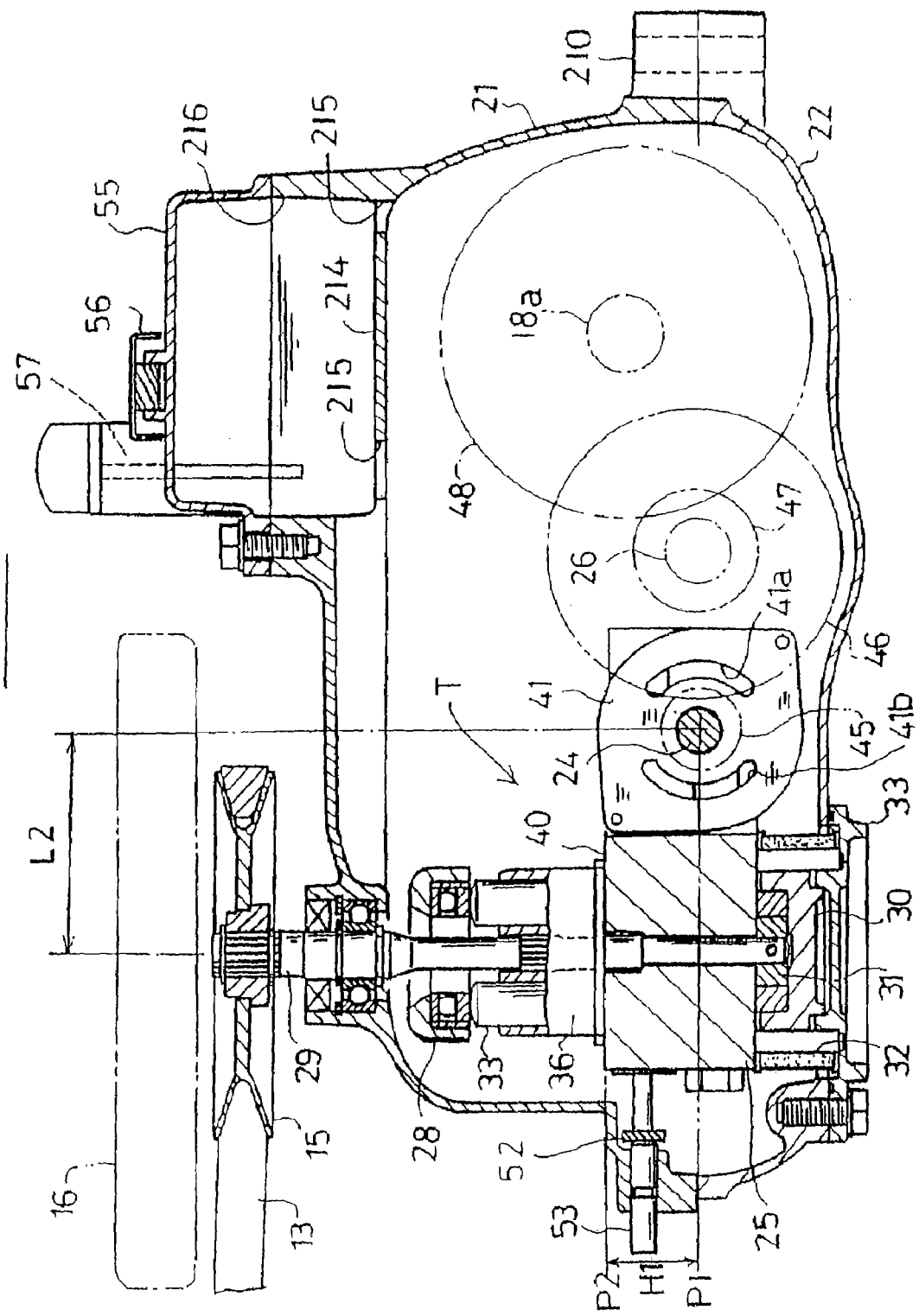
FIG. 13 is a sectional view taken on the line 13-13 in FIG. 12.
Figure 14:
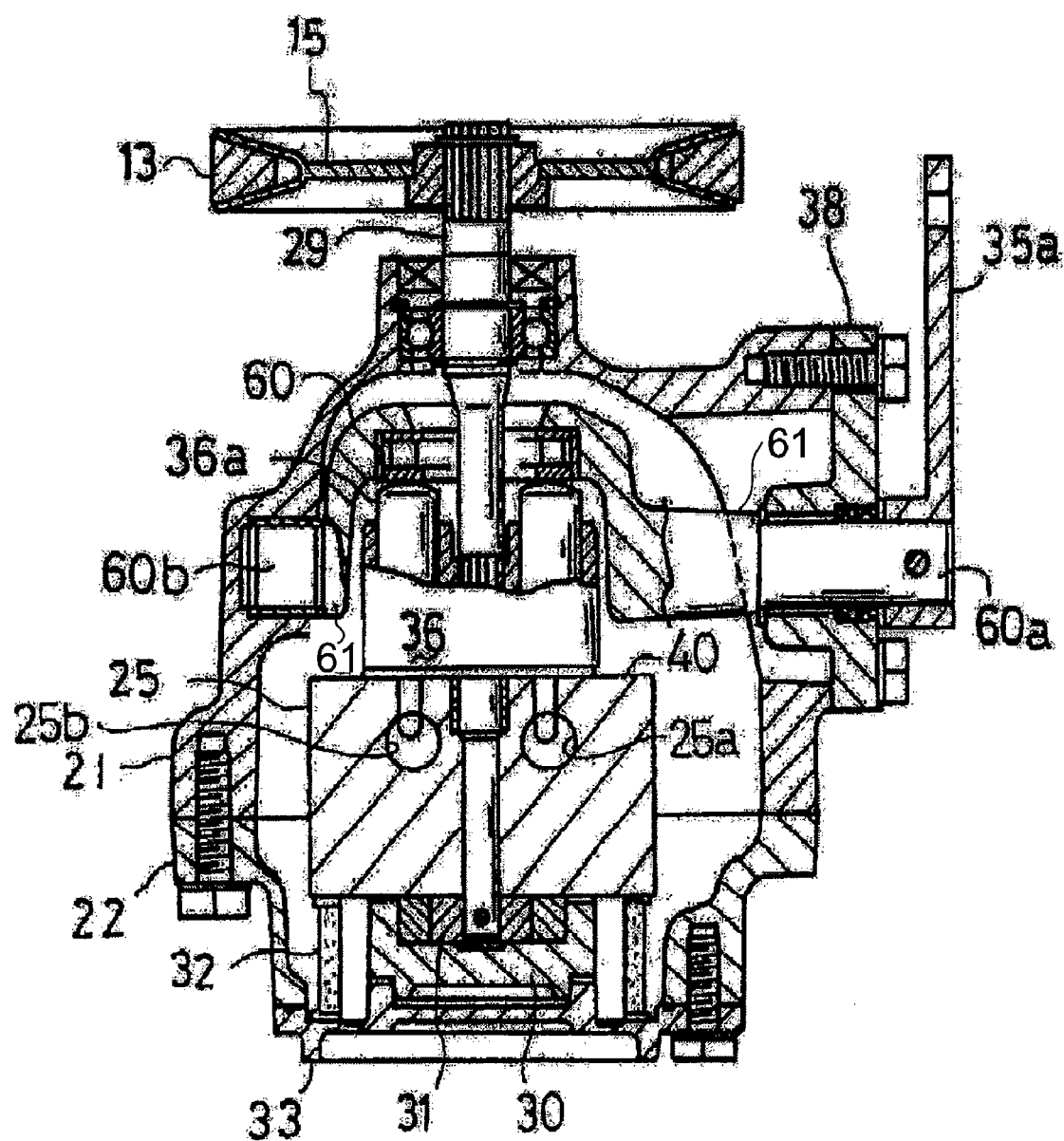
FIG. 14 is a sectional view taken on the line 14-14 in FIG. 12.
Figure 15:
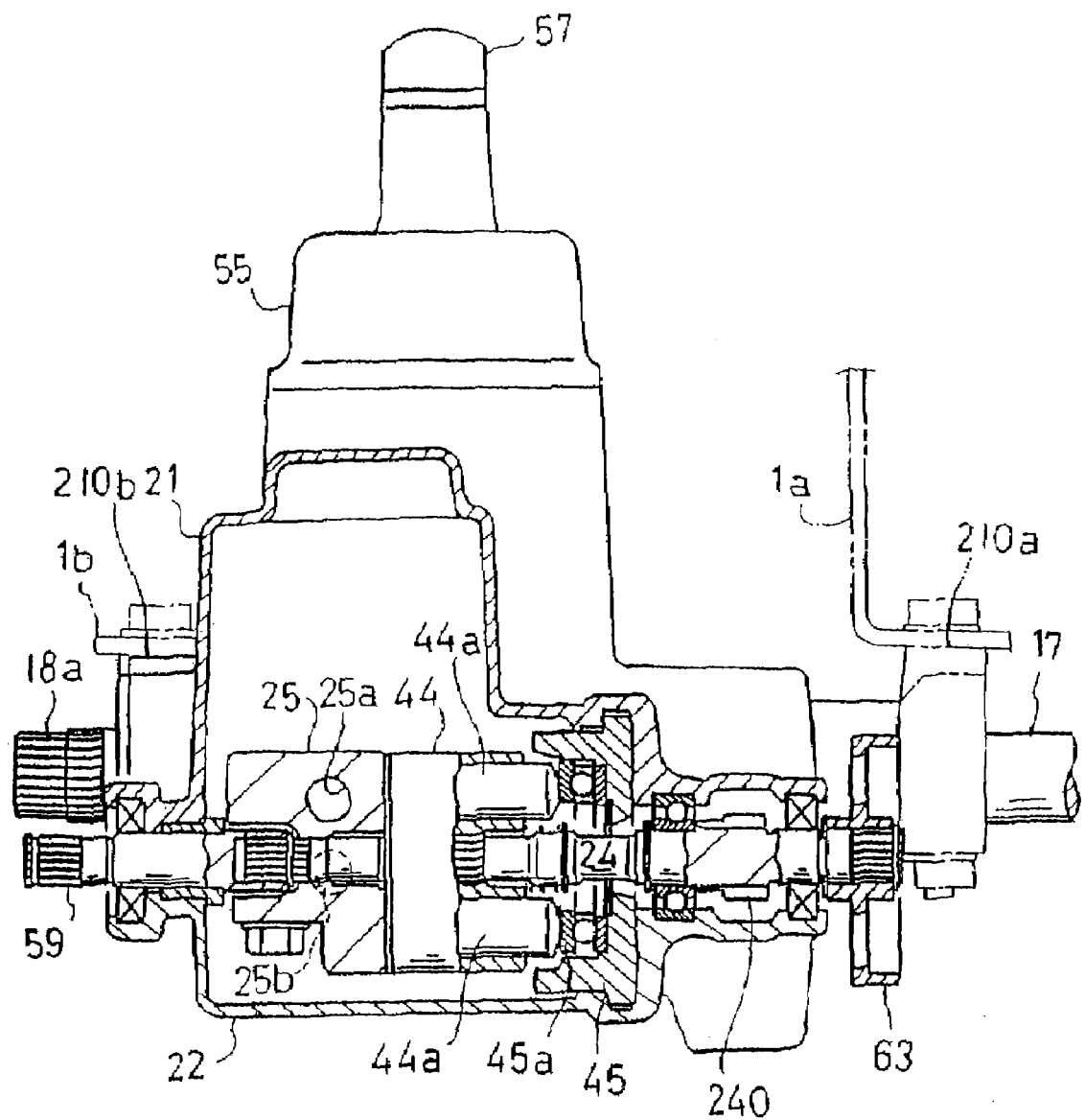
FIG. 15 is a sectional view taken on the line 15-15 in FIG. 12.
Figure 16:
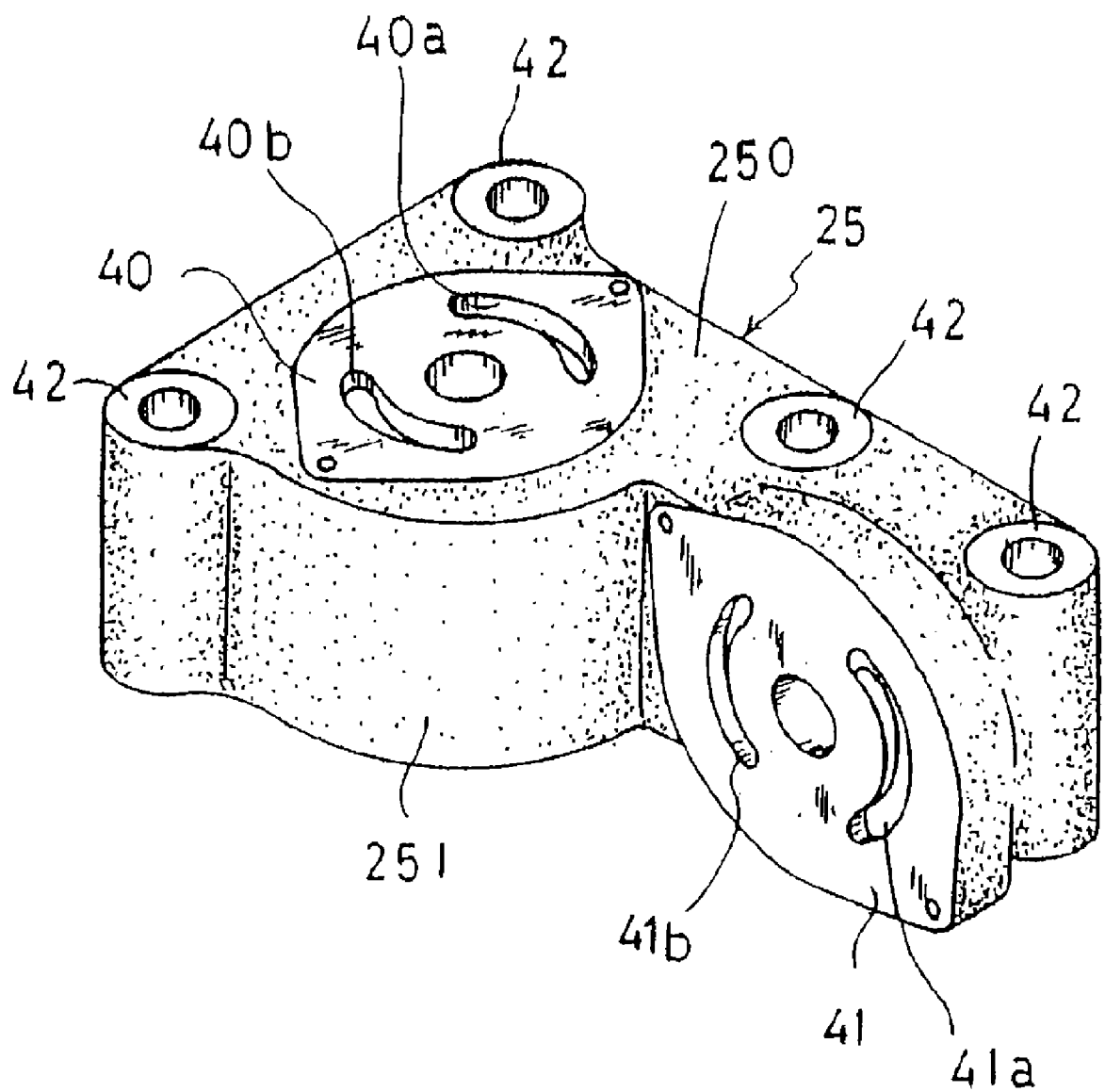
FIG. 16 is a perspective view of a center section of the second embodiment.

The front portions (portions toward the front or forward end of the lawn tractor) of upper and lower half housings 21 and 22 are enlarged in a direction perpendicular to the longitudinal axes of the axles. The housing of the axle driving unit is therefore longer (length L1) than it is wide (width W; see FIG. 4). A center section 25 for a hydraulic stepless speed change transmission T is mounted in the enlarged region. As shown in FIG. 11, center section 25 is a single and elongated piece having an upper surface 250 and a side surface 251 which are adjacent and perpendicular to each other.

A pump mounting surface 40 is formed at the front portion (toward the front or forward end of the lawn tractor) of upper surface 250 for mounting thereon a hydraulic pump. At the rear portion of side surface 251 a motor mounting surface 41 is formed for mounting a hydraulic motor. As shown in FIG. 8, pump mounting surface 40 and motor mounting surface 41 are partially overlapped with each other by a longitudinal length OL. The center of motor mounting surface 41 extends in parallel to pump mounting surface 40 and is offset downwardly therefrom by a height H1.

As shown in FIG. 11, housing mounting faces 42 are formed on upper surface 250 of center section 25, approximately level with mounting surface 40. Therefore, housing mounting faces 42 can be ground when pump mounting surface 40 is ground, so that the processing time for the pump mounting surface can be reduced. Bolt insertion bores are provided at housing mounting faces 42 and center section 25 is fixed to the inner wall of the enlarged region of upper half housing 21 through connecting bolts inserted into the bores. Pump mounting surface 40 of center section 25 extends horizontally with respect to the axles, and is disposed spaced apart from the axles. Motor mounting surface 41 extends vertically with respect to the axles, and is disposed in proximity to the axles.

Alternatively, pump mounting surface 40 and motor mounting surface 41 may be provided integral to the inner wall by increasing the thickness of the inner wall in the enlarged region of lower half housing 22. However, as shown in this embodiment, it is preferable to use center section 25 separate from the housing to facilitate processing of the housing, and to prevent oil from leaking out of the housing.

Figure 5:
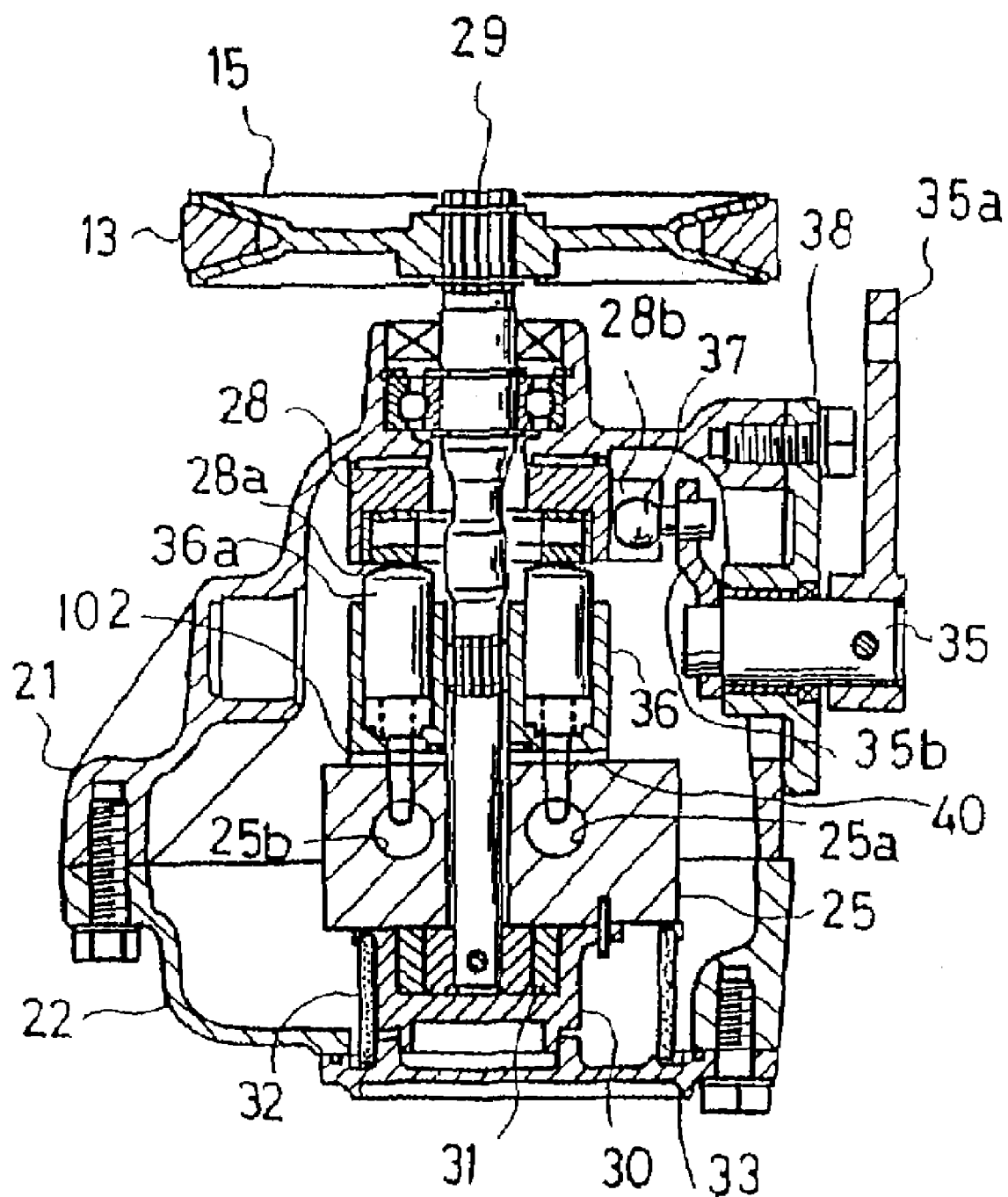
FIG. 5 is a sectional view taken on the line 5-5 in FIG. 4.

As shown in FIG. 5, a valve plate 102 is mounted onto pump mounting surface 40. A cylinder block 36, constituting the hydraulic pump, is rotatably disposed on valve plate 102. Pistons 36a are fitted into a plurality of cylinder bores of cylinder block 36, for reciprocating movement through biasing springs. Pump shaft 29 engages with a spline bore provided on the rotary axis of cylinder block 36. Pump shaft 29 is rotatably supported by upper half housing 21 and pump mounting surface 40. Pulley 15 is fixed to a projection of pump shaft 29 projecting outwardly from upper half housing 21. The heads of pistons 36a abut against a thrust bearing 28a of a movable swash plate 28, thereby forming an axial piston type variable displacement hydraulic pump. Alternatively, the hydraulic pump may be of a radial piston type or a gear type.

Pump shaft 29 is inserted into a longitudinally extending through-bore formed at the axial center of movable swash plate 28. A convex circular-arc surface is formed at the rear of movable swash plate 28, and slidably contacts with a concave circular-arc surface formed at the inner surface of the upper wall of upper half housing 21. As a result, movable swash plate 28 is movable in a longitudinal slantwise direction along the concave circular-arc surface. As movable swash plate 28 moves with respect to the rotary axis of cylinder block 36 along the contact surface, the amount and flow direction of oil discharged from the hydraulic pump changes. As shown in FIG. 5, a control shaft 35 for movably operating movable swash plate 28 extends horizontally and is rotatably supported by a lid 38 that closes a side opening of upper half housing 21. At an outer end of control shaft 35 is fixed a control lever 35a that is connected in association with a speed change operating tool (not shown). At an inner end of control shaft 35 is fixed a base of a swinging arm 35b. A ball 37, fixed to the utmost end of swinging arm 35b, engages through a joint block with an engaging groove 28b of movable swash plate 28, control shaft 35 being rotated for movement of movable swash plate 28.

Movable swash plate 28 shown in this embodiment is of a cradle type that moves slantwise along the concave circular-arc surface of the inner surface of the upper wall of upper half housing 21. To enable a trunnion-type swash plate to be mounted instead of cradle-type swash plate 28, a bearing bore is positioned on the same axis as control shaft 35 at a portion of the inner wall of upper half housing 21. Where the trunnion-type movable swash plate is used, each trunnion shaft is supported by the bearing bore and lid 38. The cradle-type movable swash plate is advantageous in that it is inexpensive to produce, while the trunnion-type is advantageous in that it requires a decreased operating force. Swash plates of both types are easily exchangeable.

Figure 6:
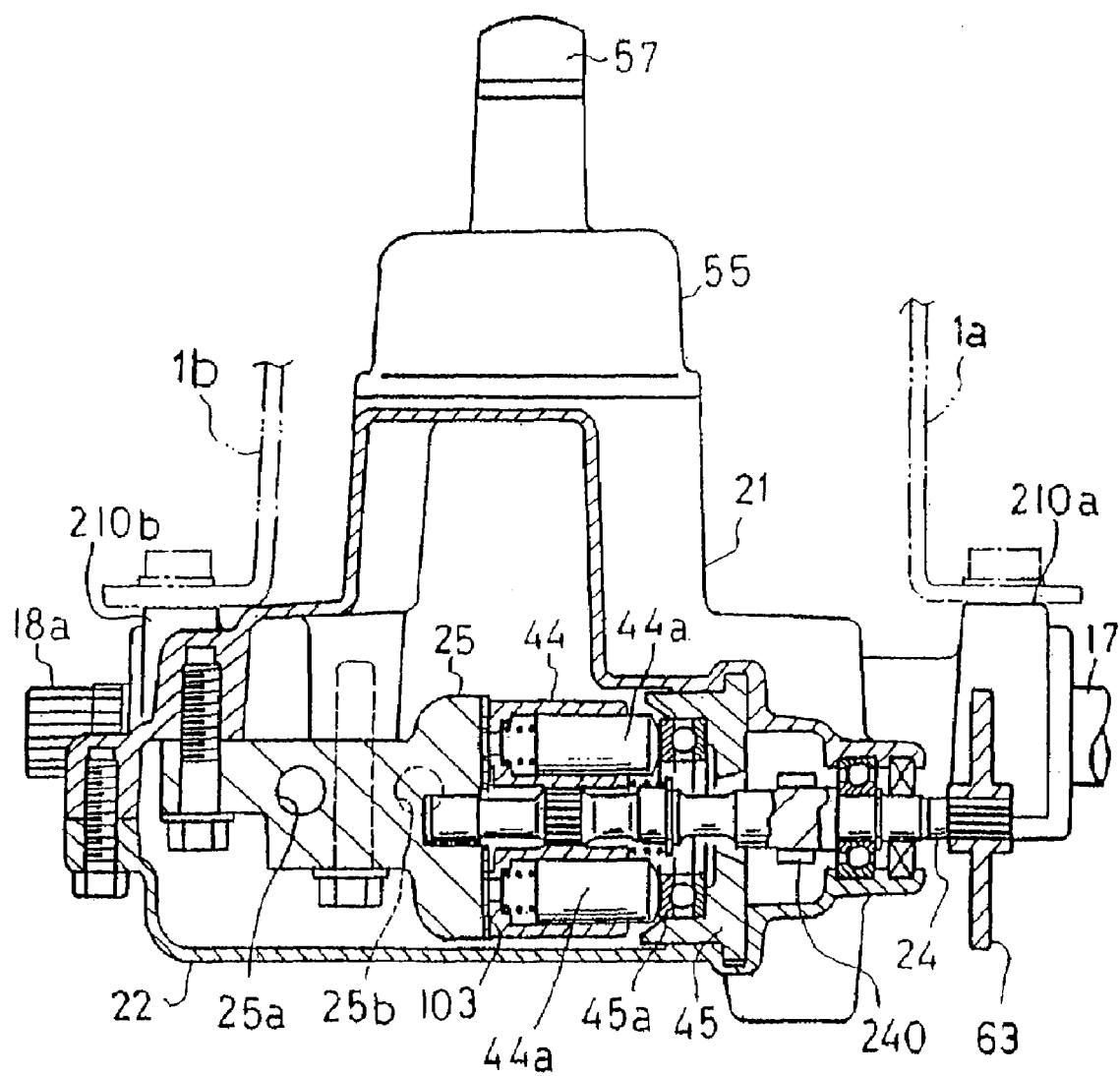
FIG. 6 is a sectional view taken on the line 6-6 in FIG. 4.

Referring to FIG. 6, a valve plate 103 is mounted onto motor mounting surface 41 formed on side surface 251 of center section 25. A cylinder block 44 of the hydraulic motor is rotatably disposed on plate 103. A plurality of pistons 44a are fitted for reciprocating movement into a plurality of cylinder bores of cylinder block 44.

The heads of pistons 44a abut against a thrust bearing 45a at a fixed swash plate 45, fixed between upper half housing 21 and lower half housing 22. A motor shaft 24 engages with a spline bore provided on the rotary axis of cylinder block 44 to form an axial-piston type fixed displacement hydraulic motor. Alternatively, the hydraulic motor may be of a radial piston type or a gear type.

The rotation axis of cylinder block 44 is positioned in the same plane as the joint surface of the upper and lower half housings. One end of motor shaft 24 is supported by motor mounting surface 41, the other end being supported by a bearing sandwiched between upper half housing 21 and lower half housing 22.

When the hydraulic pump and the hydraulic motor are disposed on a center section having the configuration described above, pump shaft 29 and motor shaft 24 are perpendicular to each other. Pump shaft 29 is offset from motor shaft 24 by a length L2 in the direction apart from the axles (see FIG. 8).

Figure 4:
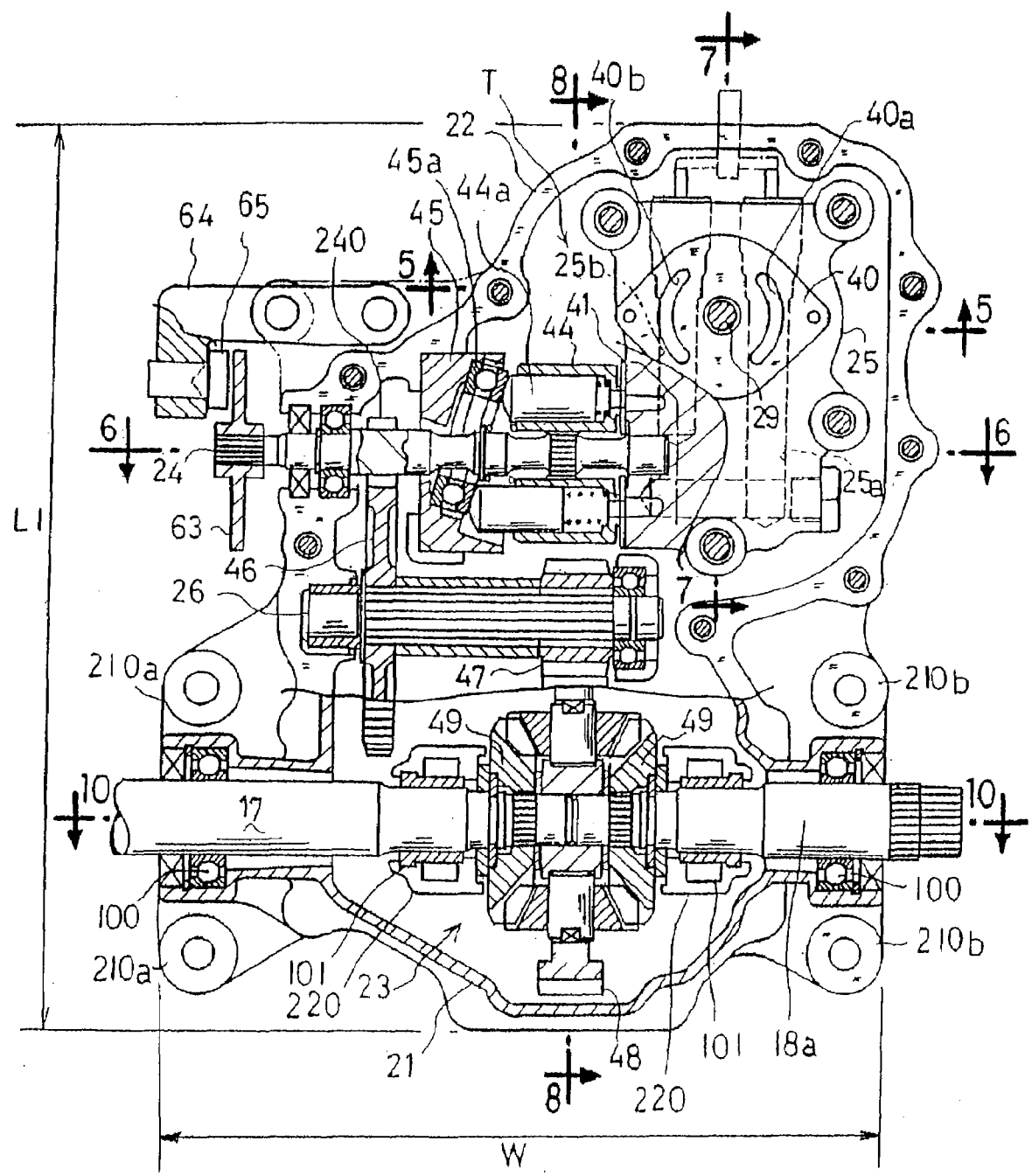
FIG. 4 is a cross sectional view taken along line 4-4 in FIG. 3 showing a first embodiment of the axle driving unit, from which an upper half housing is removed.

As shown in FIGS. 4, 9, and 11, a pair of kidney-shaped ports 40a and 40b is open on pump mounting surface 40 of center section 25 to take in or discharge oil in cylinder block 36. A pair of kidney-shaped ports 41a and 41b is also open on motor mounting surface 41 to take in or discharge oil in cylinder block 44. Within center section 25 are provided an L-like shaped oil passage 25a and a straight oil passage 25b for connecting kidney-shaped ports 40a and 41a, and 40b and 41b with each other, respectively, to circulate the operating oil between the hydraulic pump and hydraulic motor, thereby making a closed circuit.

The hydraulic pump and hydraulic motor are fluidly connected with each other through the above-mentioned closed circuit, and the combination of these members forms a hydraulic stepless speed change transmission. Capacity of the hydraulic pump is changed by rotatably operating control lever 35a, thereby enabling the hydraulic motor to obtain stepless output rotation.

Operating oil supply means is provided for replenishing oil that has leaked out from center section 25. The supply means may be the hydraulic pump itself, or a charge pump 31.

Figure 7:
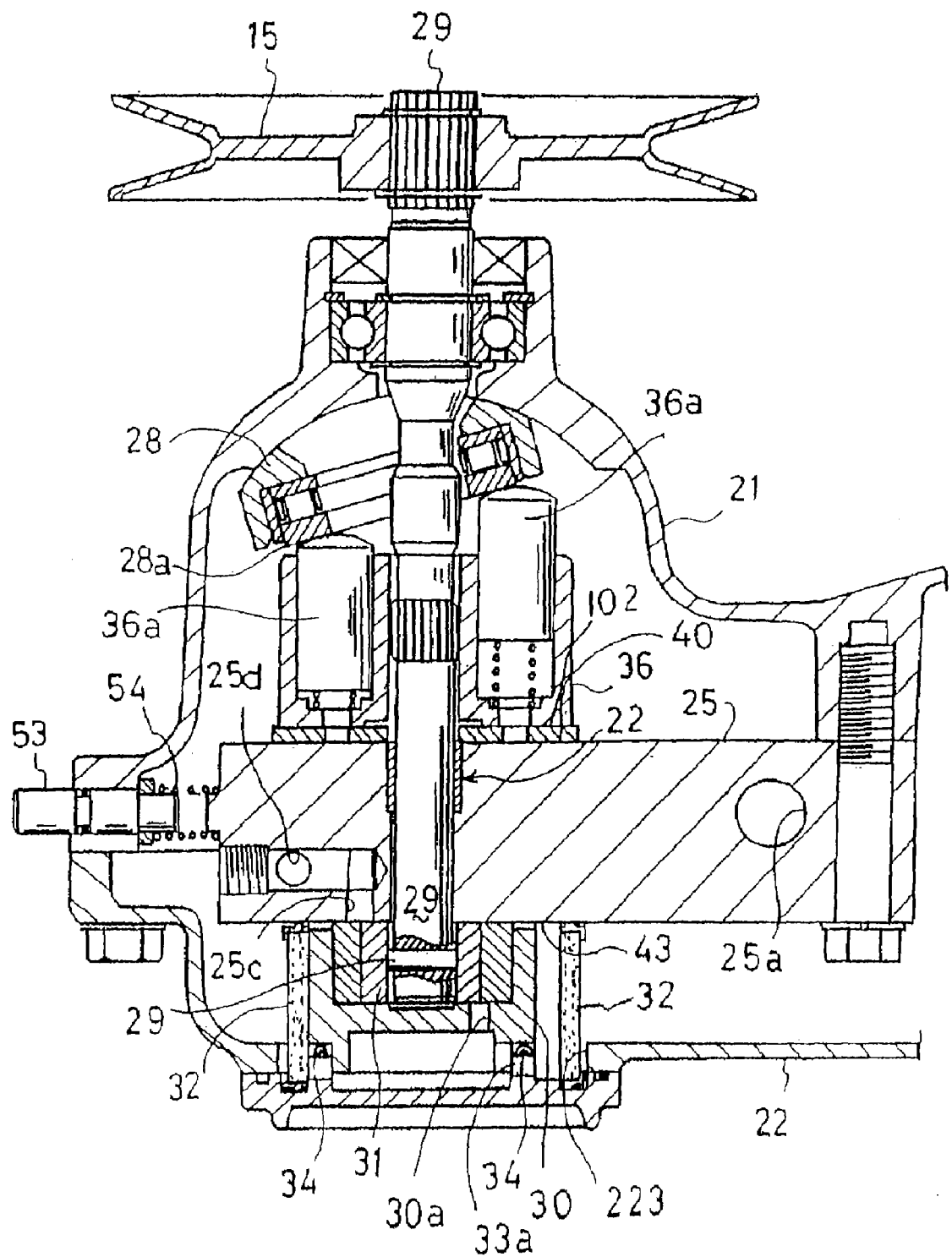
FIG. 7 is a sectional view taken on the line 7-7 in FIG. 4.

Charge pump 31, as shown in FIGS. 5 and 7, is a trochoid pump which is contained in a charge pump casing 30 attached to a charge pump mounting surface 43 formed on the lower surface of center section 25. A wave washer 34 is interposed between a stepped portion at the outer periphery of charge pump casing 30, and a bottom surface of a lid 33 that closes an opening 223 in lower half housing 22. Wave washer 34 biases charge pump 31 so that charge pump 31 is in contact with charge pump mounting surface 43. The lower end of pump shaft 29 passes through center section 25 and projects from charge pump mounting surface 43, and a pin is mounted on shaft 29. An engaging bore is open at the center of an internal gear of charge pump 31. The lower end of pump shaft 29 is inserted into the engaging bore, and pump shaft 29 engages with the internal gear. Charge pump 31 is fixed to the lower end of pump shaft 29 and is driven by pump shaft 29.

Charge pump casing 30 is disposed in an oil sump formed by the housing. A suction port 30a of charge pump 31 is open at the lower surface of charge pump casing 30. Suction port 30a connects with the oil sump in the housing through a groove 33a formed by partially cutting out a wave washer mounting portion at lid 33. An annular oil filter 32 is fixed between charge pump mounting surface 43 and the bottom surface of lid 33. Since oil filter 32 surrounds charge pump 31 and charge pump casing 30, existing oil is cleaned and then taken in by charge pump 31 through groove 33a and suction port 30a. When oil filter 32 is maintained and inspected, lid 33 is removed from lower half housing 22, and oil filter 32 is removed from the housing through an opening 223 of lower half housing 22, oil filter 32 being smaller in outline than opening 223.

The pressure oil discharged from charge pump 31 is directly guided into a supply oil passage 25c open in charge pump mounting surface 43. If the introduced pressure exceeds the pressure corresponding to a biasing force of the wave washer biasing means, the pressure causes charge pump casing 30 to move away from or detach from charge pump mounting surface 43 against the biasing force of wave washer 34. This creates a gap between charge pump 31 and charge pump mounting surface 43. Pressure oil is then released in part from the gap into the oil sump to adjust its pressure below the biasing force of wave washer 34. Charge pump 31 is detached from charge pump mounting surface 43 to adjust the discharge pressure below the biasing force while maintaining fluid communication between the discharge port and the oil supply port.

As shown in FIG. 8, due to the form of center section 25, pump mounting surface 40 is positioned in the second plane P2 in upper half housing 21, in parallel to and spaced apart by a height H1 from the first plane P1 coincident with the joint surface of the housing. Hence, a wide space is formed between charge pump mounting surface 43 positioned opposite to pump mounting surface 40, and the inner surface of the bottom of lower half housing 22. As a result, charge pump 31 and oil filter 32 can be contained in this space with ample room. Height H2 from the axis of the axles to the bottom of lower half housing 22 is reduced to ensure sufficient ground clearance.

As shown in FIG. 9, check valves 150 are disposed at the open ends of oil passages 25a and 25b in the closed circuit of center section 25. Check valves 150 mutually communicate at the inlet ports through one transverse passage 25d. Transverse oil passage 25d communicates at the intermediate portion with a supply oil passage 25c open at charge pump mounting surface 43 of center section 25. Oil introduced from the discharge port of charge pump 31 to supply oil passage 25c reaches the inlet side of each check valve 150. The oil pressure pushes out check valves 150, positioned at the low pressure side of oil passages 25a and 25b, so that oil is supplied from the outlet side into the closed circuit.

Check valves 150 are slidably provided with push pins 151 that project outward from center section 25. An axial end of each push pin 151 comes in contact with a single connecting plate 52 in the housing, and a release rod 53 is fixed at the center of connecting plate 52. Release rod 53 projects outwardly from upper half housing 21 at one end. Connecting plate 52 is outwardly biased by a spring 54 interposed between plate 52 and center section 25. Release rod 53 is manually pushed in, so that push pins 151 simultaneously push out check valves 150 so that the inlet port is in fluid communication with the outlet port. Hence, oil passages 25a and 25b communicate with each other through transverse oil passage 25d, thereby enabling the hydraulic motor to idle.

As shown in FIGS. 4 and 8, motor shaft 24 is disposed in parallel to axles 17 and 18. A counter shaft 26 is provided between the axles and motor shaft 24, and extends in parallel to the axles and motor shaft 24. A gear 240 is provided on motor shaft 24 and engages with a larger diameter gear 46 fixed onto counter shaft 26. A smaller diameter gear 47 on counter shaft 26 engages with a ring gear 48 of differential gear 23. Thus, a driving force output from motor shaft 24 is transmitted to axles 17 and 18 through a gear system speed reduction transmission and differential gear 23.

As shown in FIG. 4, a braking friction plate 63 is fixed on motor shaft 24, an arm 64 is fixed to upper half housing 21, and a brake actuator 65 is provided at one end of arm 64. An operating lever (not shown) is rotated to bring brake actuator 65 in press contact with braking friction plate 63, thereby enabling motor shaft 24 to be braked.

The axis of counter shaft 26 is positioned in the first plane P1. It is supported at both axial ends by a pair of bearings interposed between upper half housing 21 and lower half housing 22.

As shown in FIG. 8, a pocket projects from the bottom of lower half housing 22 to define height H2. The lower portion of larger diameter gear 46 on counter shaft 26 is contained within this pocket.

The axes of axles 17 and 18 may be disposed in the first plane P1. However, it is preferable to dispose the axes above the first plane P1 as shown in this embodiment. This is because, even when a large diameter input gear 48 is used in order to enlarge the last gear ratio, the lower portion of input gear 48 will not extend lower than the lower portion of larger diameter gear 46. Therefore, the pocket for gear 46 need not be further enlarged, thereby enabling height H2 to be as small as possible so that ground clearance is ensured.

As shown in FIG. 4, differential gear unit 23 is displaced in the housing toward part 18a of second axle 18. A space is thereby formed at one lateral side of a second axle holder. The larger diameter gear 46 is partly disposed in this space so that the length of the housing does not have to be increased. As shown in FIG. 8, a partition 214 for covering an upper portion of input gear 48 is integrally formed in upper half housing 21 and an oil flow-through bore 215 is formed at partition 214. An opening 216 is formed at a portion of the upper wall of upper half housing 21 positioned above partition 214, and covered with a cover member 55. Cover member 55 is provided with a breather 56 and an oil check rod 57 that is also used as an oil charge plug. A predetermined amount of oil is charged into the housing through cover member 55 so that the boundary of oil and air is formed in a space enclosed by partition 214 and cover member 55. Air mixed in the oil when charged into the housing is collected in an air reservoir through oil flow-through bore 215. Partition 214 is filled at the lower portion with oil, so that, even when the various gears rotate, the air in the air reservoir is scarcely mixed in the oil. When the axle driving unit is operated for a long time, the oil volume expands. The volume of air in the air reservoir decreases to accommodate the expanded volume of oil.

A second embodiment of the axle driving unit is shown in FIGS. 12-16. The second embodiment is almost the same in construction as the first embodiment so that the same parts are designated with the same reference numerals and the description is omitted. As such, only three points of different construction will be described.

In the case where a lawn tractor includes a wide space underneath the tractor where the mower is disposed, the enlarged region of the housing is extended forwardly as much as possible. The width of the housing is made as small as possible, thereby enabling the grass chute to increase in volume.

Therefore, a first difference is to elongate the enlarged region of the housing, and to suitably form center section 25 for such an enlarged region. Pump mounting surface 40 and motor mounting surface 41, formed on upper surface 250 and side surface 251 of center section 25, are formed so that motor mounting surface 41 laterally overlaps pump mounting surface 40. As a result, center section 25 can be contained in the enlarged region having width Wa (see FIG. 12). Cylinder block 36 of the hydraulic pump is disposed further away from axles 17 and 18 than in the first embodiment. Length L2 from pump shaft 29 to motor shaft 24 is larger in this embodiment (see FIG. 13) than in the first embodiment (see FIG. 8). There is no overlap OL in this embodiment as there was in the first embodiment (see FIG. 8).

A third mount boss 210c is provided at the utmost end of the enlarged region of the housing. Mount boss 210c is connected to a third mounting member (not shown) hanging from body frame 1. Therefore, even when the entire length L1 of the housing becomes larger, the axle driving unit remains in a proper operating position.

A second difference is with respect to motor shaft 24. As in the first embodiment, braking friction plate 63 is disposed on one end of motor shaft 24 that extends outwardly from the housing. The difference in this embodiment is that the other end of motor shaft 24 is provided with a spline, and it extends into a through-open bore provided at the center of motor mounting surface 41. A bushing is interposed between the joint surfaces of the housing to support a rotary shaft 59 (see FIG. 12). The spline end of motor shaft 24 is spline-engaged with one end of rotary shaft 59 so that the driving force of motor shaft 24 is taken out of the housing through rotary shaft 59.

The outer end of rotary shaft 59 is an indented spline. Braking friction plate 63 may be mounted on this end of rotary shaft 59, or rotary shaft 59 may be used as a power take-out shaft. If such construction is not required, rotary shaft 59 can be removed and the bore formed at the joint surfaces of the housing can be closed by a seal cap.

A third difference is found in the movable swash plate of the hydraulic pump. Movable swash plate 60 of a trunnion-type is used in place of that of a cradle-type. One trunnion shaft 60*a* of movable swash plate 60 is supported by a lid 38 mounted to upper half housing 21, the other trunnion shaft 60*b* being supported by a bearing bore provided at the inner wall of upper half housing 21 (see FIG. 14). Opposite sides of moveable swash plate 60 include step portions 61, whereby movable swash plate 60 is prevented from moving toward an axial direction along a rotary axis of trunnion shafts 60*a* and 60*b*. Trunnion shaft 60*a* projects outwardly from lid 38 and a control lever 35*a* is mounted onto the projection.

Figure 17:
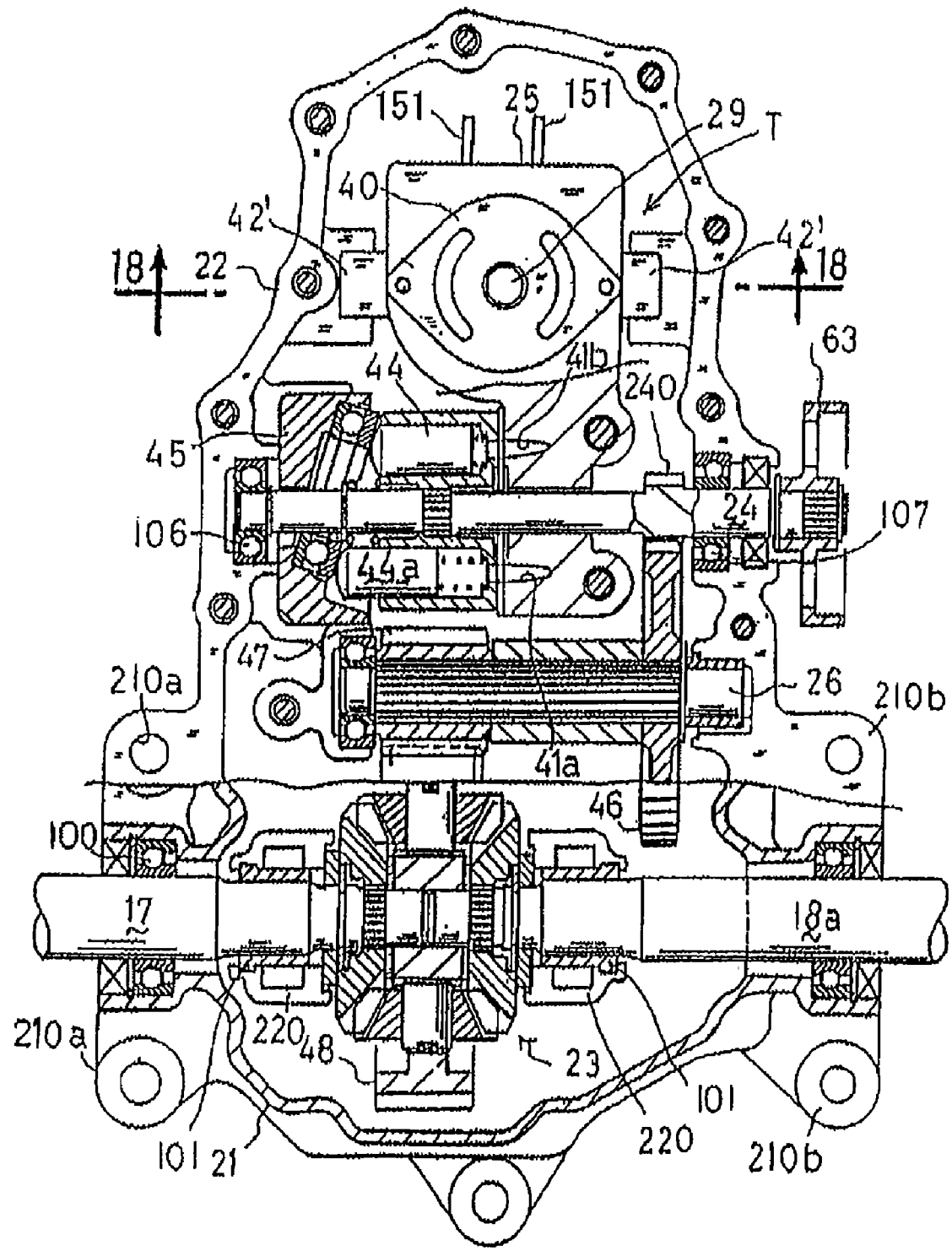
FIG. 17 is a partially sectional plan view of a third embodiment of the axle driving unit, from which an upper half housing is removed.
Figure 18:
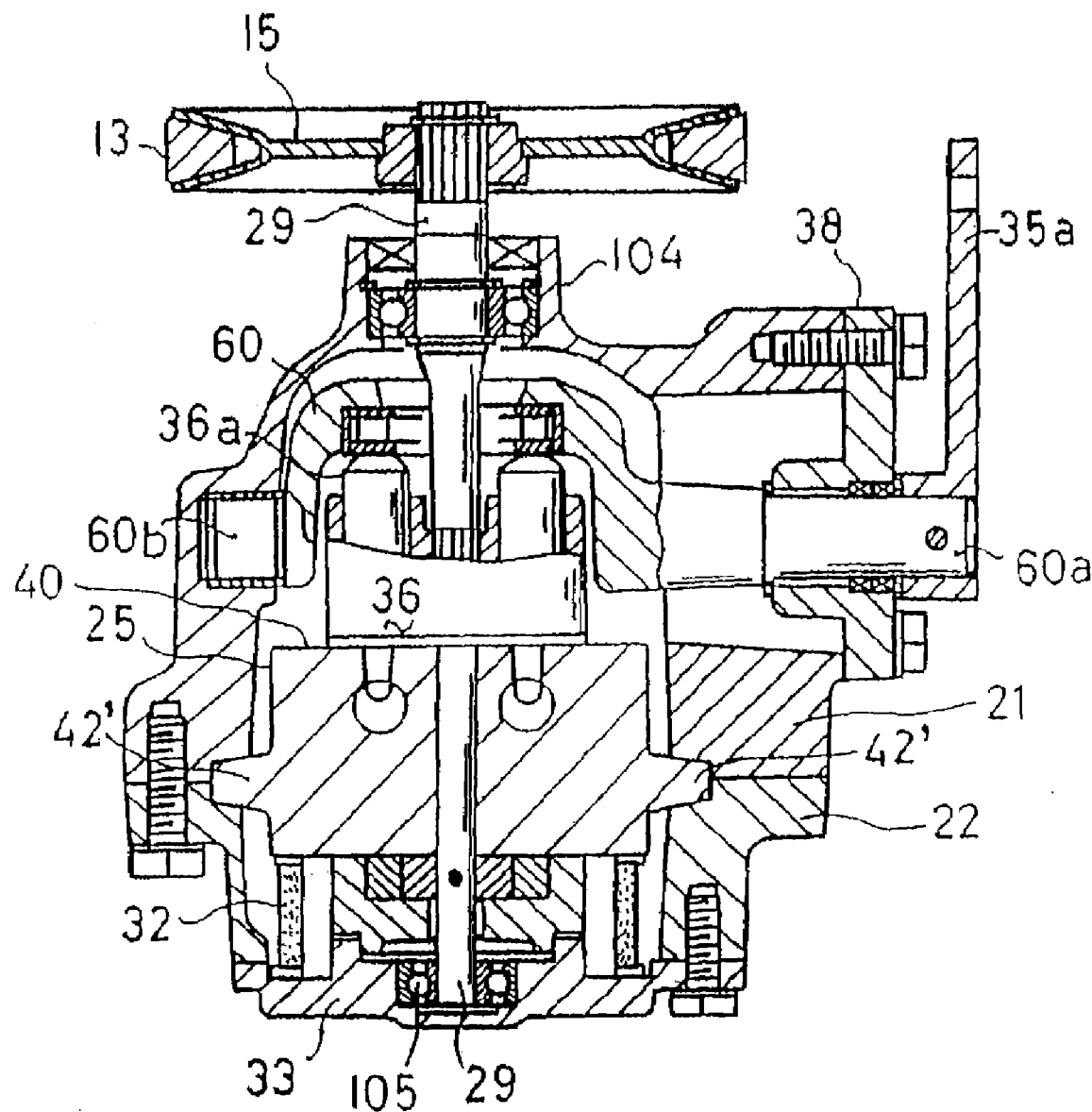
FIG. 18 is a sectional view taken on the line 18-18 in FIG. 17.
Figure 19:
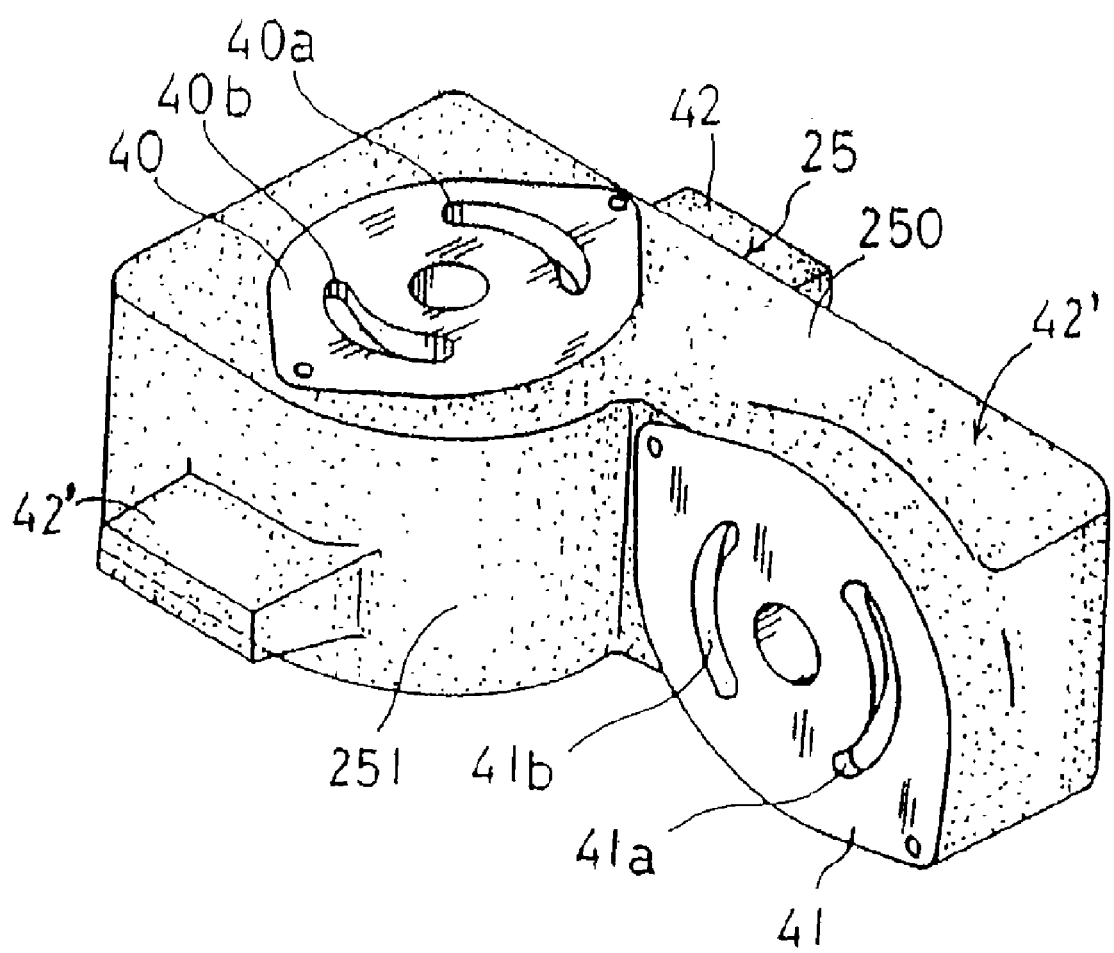
FIG. 19 is a perspective view of a center section of the third embodiment.

A third embodiment of the axle driving is shown in FIGS. 17-19. The construction of the third embodiment compares to that of the second embodiment as follows.

Center section 25 is not connected to upper half housing 21 by bolts, but inserted in part between upper half housing 21 and lower half housing 22. Therefore, center section 25 is positioned in the enlarged region in a free-standing state. Housing mounting faces 42' project from the left and right side surfaces 251. The upper surface of center section 25 and the lower surface opposite thereto form housing mounting faces. Since center section 25 is free-standing, bolts are not required so that assembly is simplified and manufacturing cost is lowered.

In order for center section 25 to be free-standing, pump shaft 29 and motor shaft 24 are completely supported by the housing. Upper end of pump shaft 29 is supported by a bearing 104 attached to upper half housing 21. Lower end of pump shaft 29 passes through mounting surface 40 and charge pump mounting surface 43 and is supported by a bearing 105 attached to lower half housing 22 (see FIG. 18). Motor shaft 24 passes through motor mounting surface 41 and the two ends are supported by bearings 106 and 107 inserted between both upper half and lower half housings 21 and 22 (see FIG. 17).

In the axle driving unit of an embodiment to be discussed below, as in the second and third embodiments, the enlarged region is made as elongated as possible in order to allow greater volume for the chute of the rear discharge lawn tractor.

Figure 20:
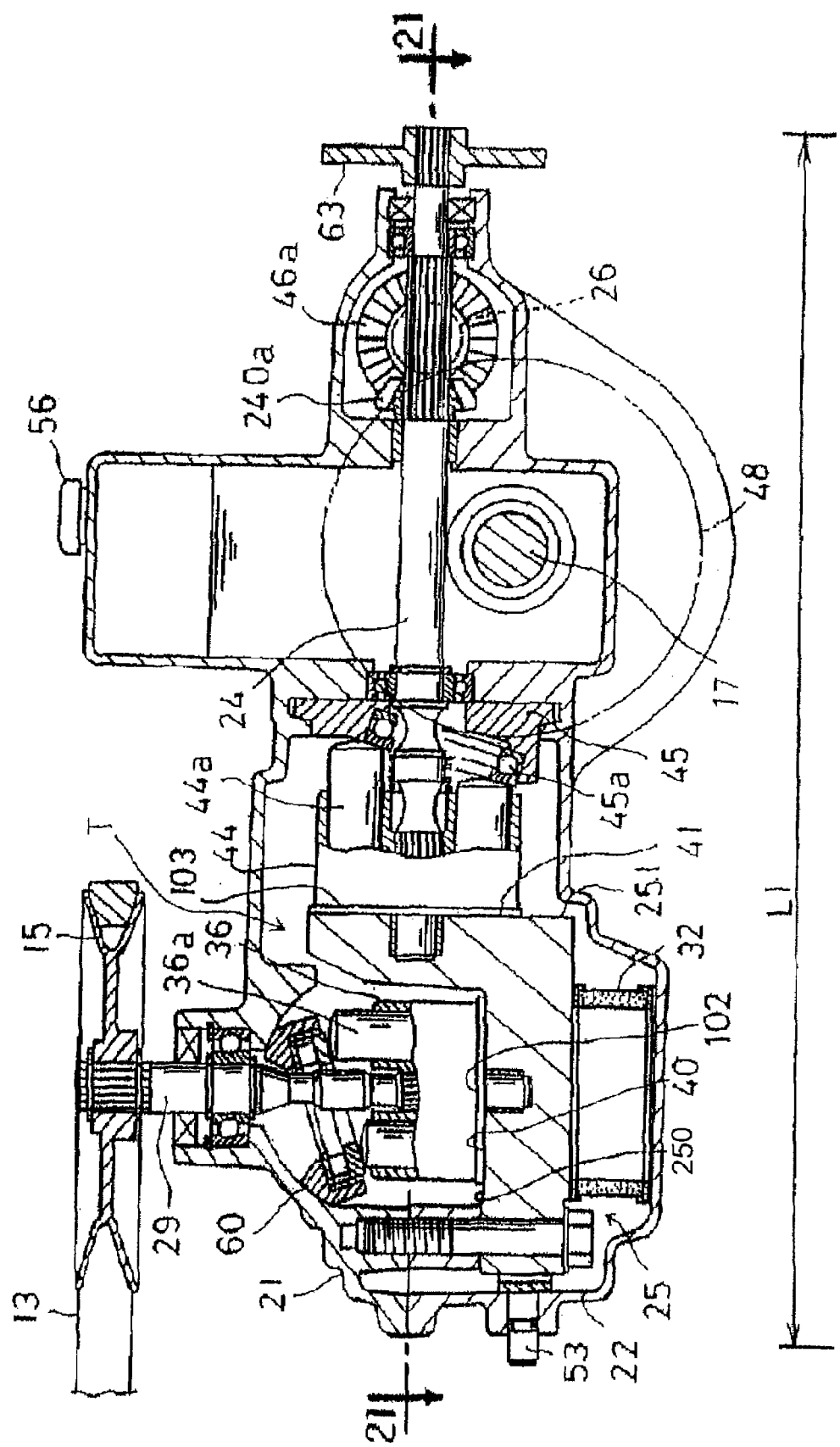
FIG. 20 is a sectional side view of a fourth embodiment of the axle driving unit.
Figure 21:
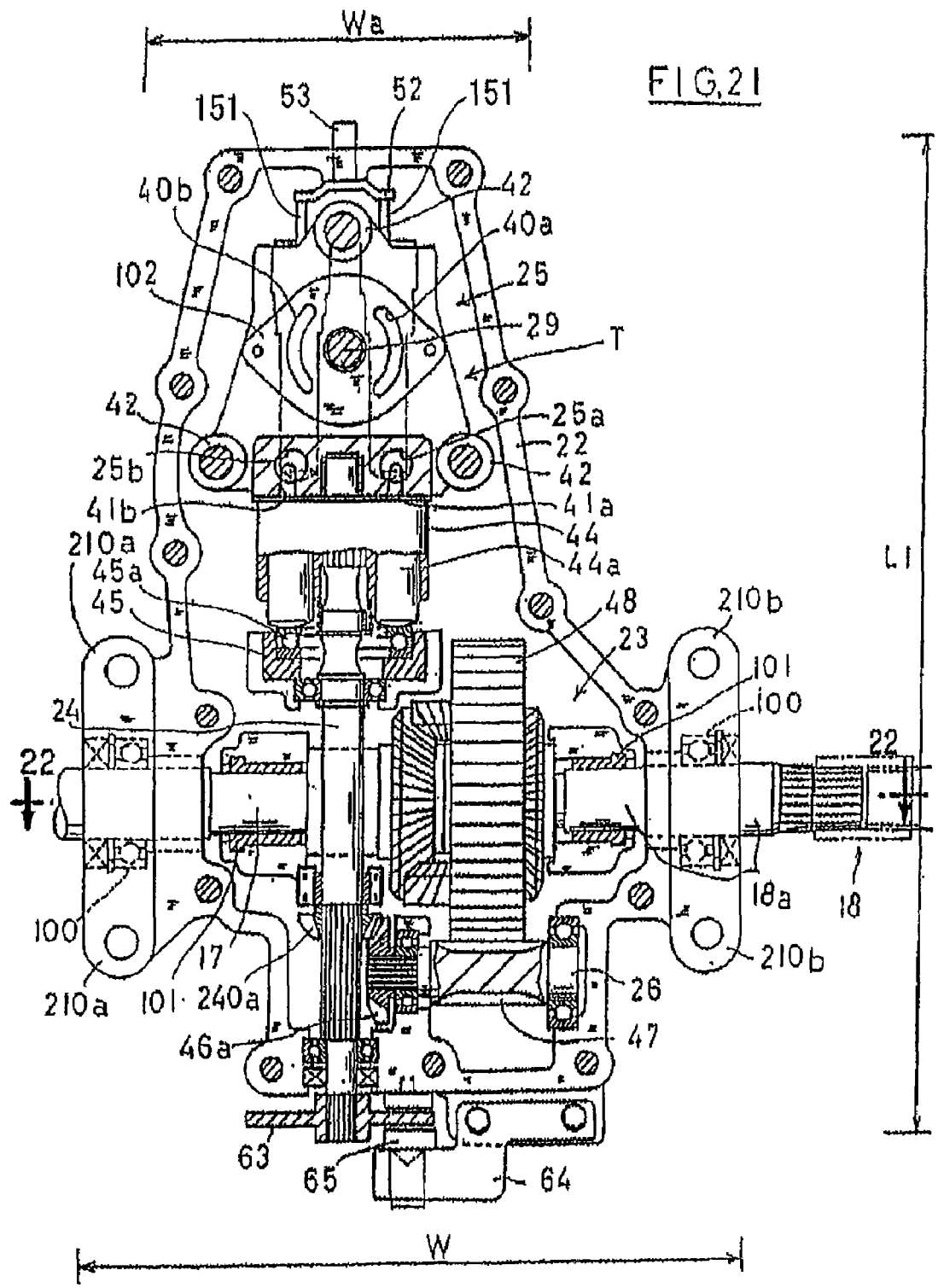
FIG. 21 is a sectional plan view taken on the line 21-21 in FIG. 20.
Figure 22:
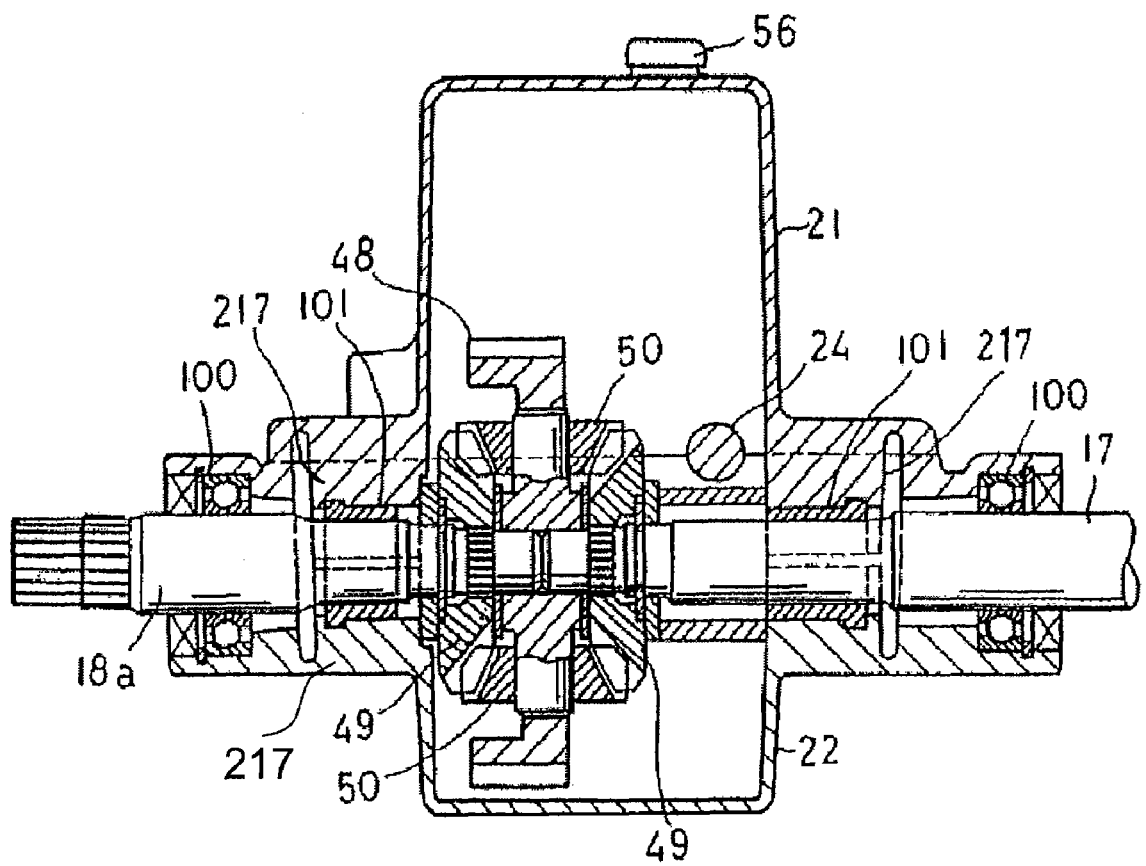
FIG. 22 is a sectional front view taken on the line 22-22 in FIG. 21.

A fourth embodiment of the axle driving unit will be described in accordance with FIGS. 20, 21 and 22. A center section 25 of substantially L-like shape in sectional side view is disposed in an elongated enlarged region extending across upper half housing 21 and lower half housing 22, and is fixed to upper half housing 21. A pump mounting surface 40 is formed on a substantially horizontal upper surface 250, and a motor mounting surface 41 on a substantially vertical side surface 251 of center section 25. Pump mounting surface 40 is positioned apart from axles 17 and 18, and motor mounting surface 41 is positioned near the axles. Pump shaft 29 extends substantially vertically with respect to axles 17 and 18, and motor shaft 24 extends substantially horizontally with and perpendicular to axles 17 and 18.

A movable swash plate 60 at the hydraulic pump is of a cradle-type and uses the same operating mechanism as that in the first embodiment so that it is manually controllable along a concave circular-arc surface of an inner wall of upper half housing 21.

An oil filter 32 is interposed between the lower surface of center section 25, opposite to pump mounting surface 40, and the inner surface of the bottom wall of lower half housing 22. Oil in the housing is filtered by oil filter 32 and guided to a supply port (not shown) open at the lower surface of center section 25.

A pair of kidney-shaped ports 40*a* and 40*b* open at pump mounting surface 40, and a pair of kidney-shaped ports 41*a* and 41*b* open at motor mounting surface 41 are connected with each other through a pair of substantially L-like-shaped oil passages 25*a* and 25*b*, respectively. As shown in FIG. 9, check valves are disposed at the open ends of oil passages 25*a* and 25*b*. In this embodiment, operating oil is supplied by operation of the hydraulic pump itself, but a charge pump as described in the previous embodiments may alternatively be used.

The axis of motor shaft 24 is positioned in the same plane as the joint surface of the housing. Motor shaft 24 is rotatably supported by bearings interposed between upper half housing 21 and lower half housing 22.

First axle 17 and part 18*a* of second axle 18 are rotatably supported by lower half housing 22. Distal portions of first axle 17 and part 18*a* of second axle 18 are supported by bearings 100 held into cylindrical bores of lower half housing 22. The bases of axles 17 and 18 are supported by bushings 101 disposed in lower half housing 22. Bushings 101 are fixedly interposed between legs 217, long enough to extend beyond the joint surface of the housing, and the concave circular-arc surface of lower half housing 22 (see FIG. 22).

Differential gear 23 is displaced toward part 18*a* of second axle 18 in the housing. Motor shaft 24 is substantially perpendicular to first axle 17, and passes above axle 17 as it extends toward the rear of the housing. The utmost end of motor shaft 24 projects from the housing, and a braking friction plate 63 is attached to the utmost end of motor shaft 24.

A counter shaft 26, extending in parallel to axles 17 and 18, is disposed at the rear of the housing. The axis of shaft 26 is positioned in the same plane as the joint surface of the housing. Shaft 26 is rotatably supported by bearings sandwiched between upper half housing 21 and lower half housing 22.

Since motor shaft 24 and counter shaft 26 are substantially perpendicular to each other, a smaller diameter bevel gear 240*a* on motor shaft 24 and a larger diameter bevel gear 46*a*, engageable with bevel gear 240*a*, on counter shaft 26 are used to connect the shafts together in a driving manner. The driving force is transmitted from a smaller diameter gear 47 on counter shaft 26 to axles 17 and 18 through a ring gear 48 on differential gear 23.

Figure 23:
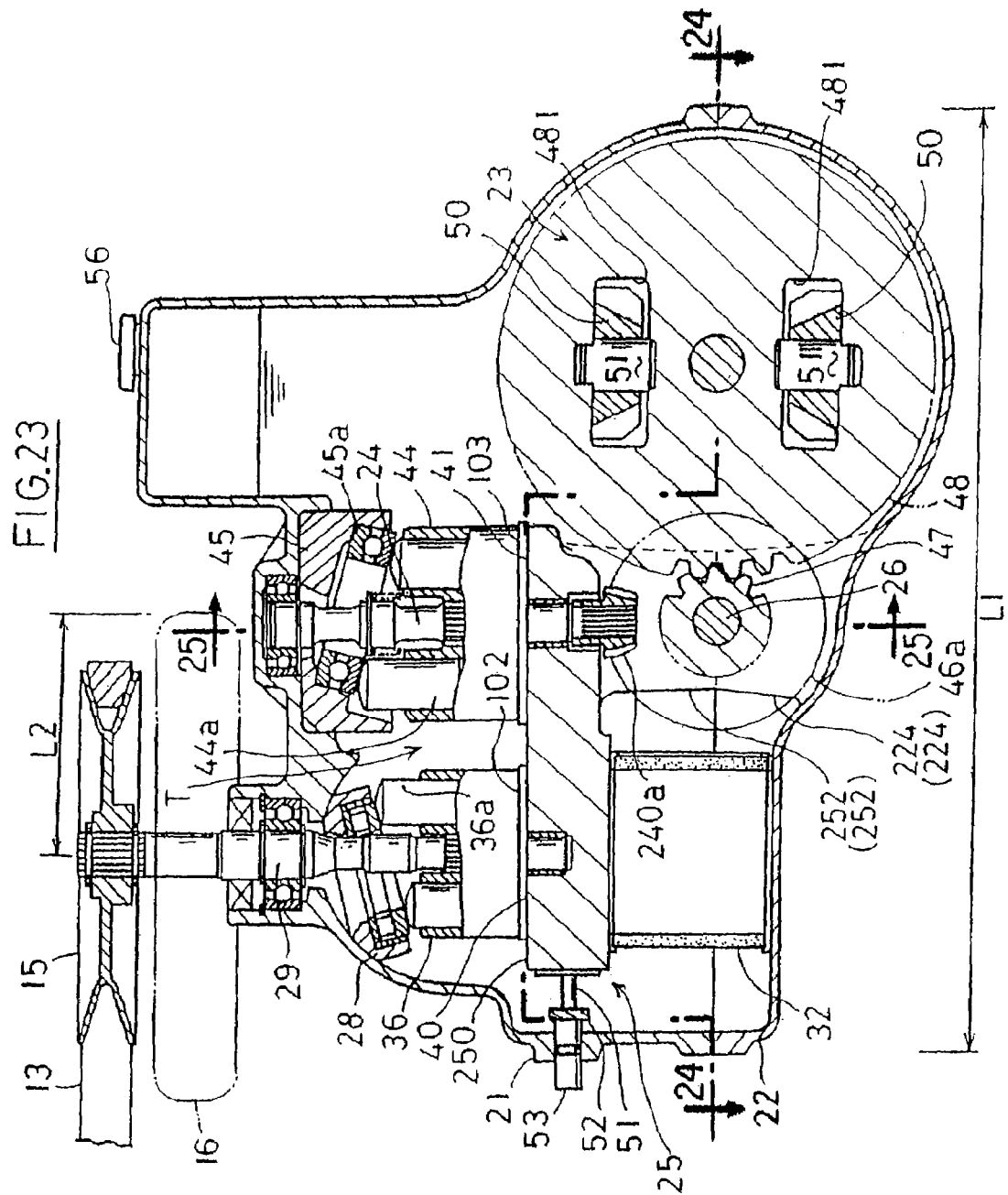
FIG. 23 is a sectional side view of a fifth embodiment of the axle driving unit.
Figure 24:
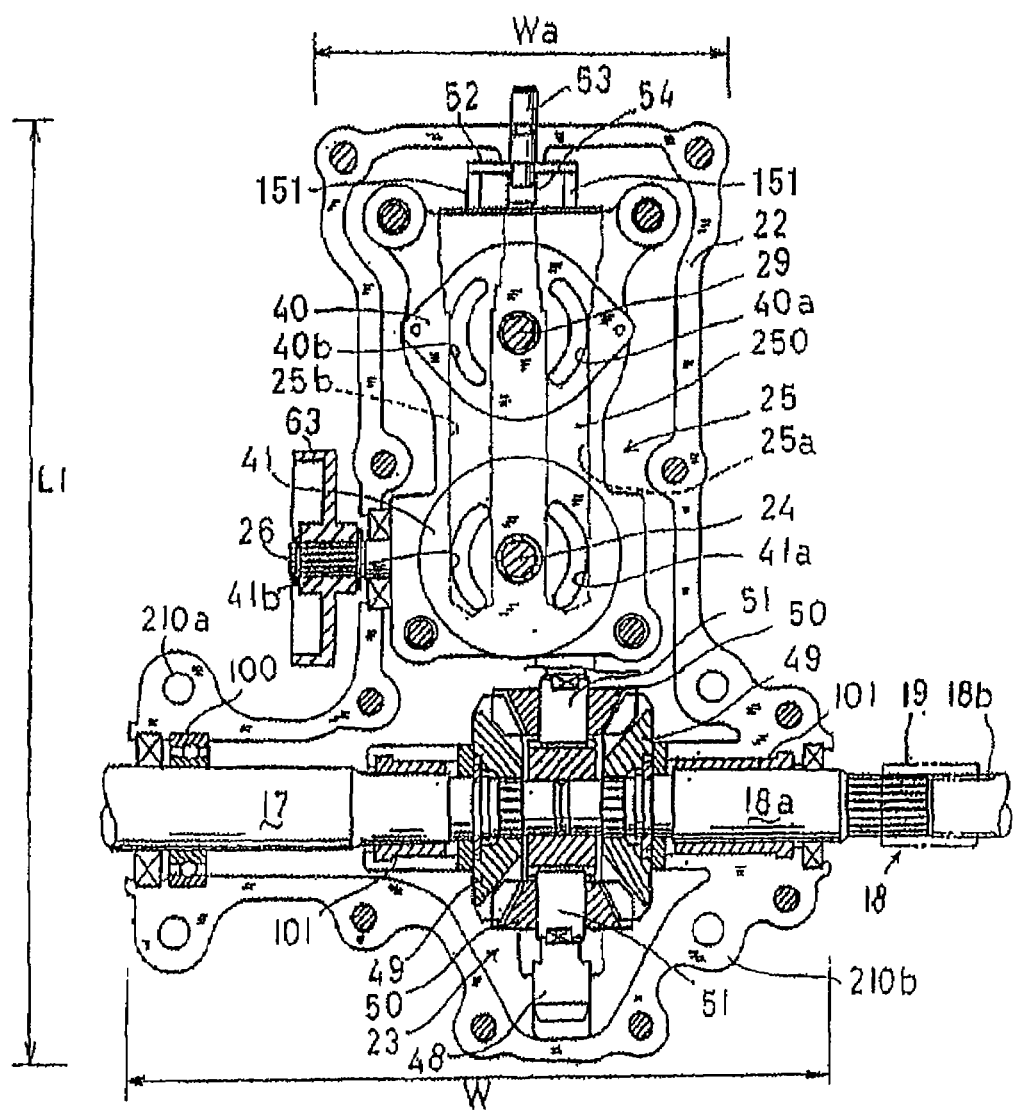
FIG. 24 is a sectional plan view taken on the line 24-24 in FIG. 23.
Figure 25:
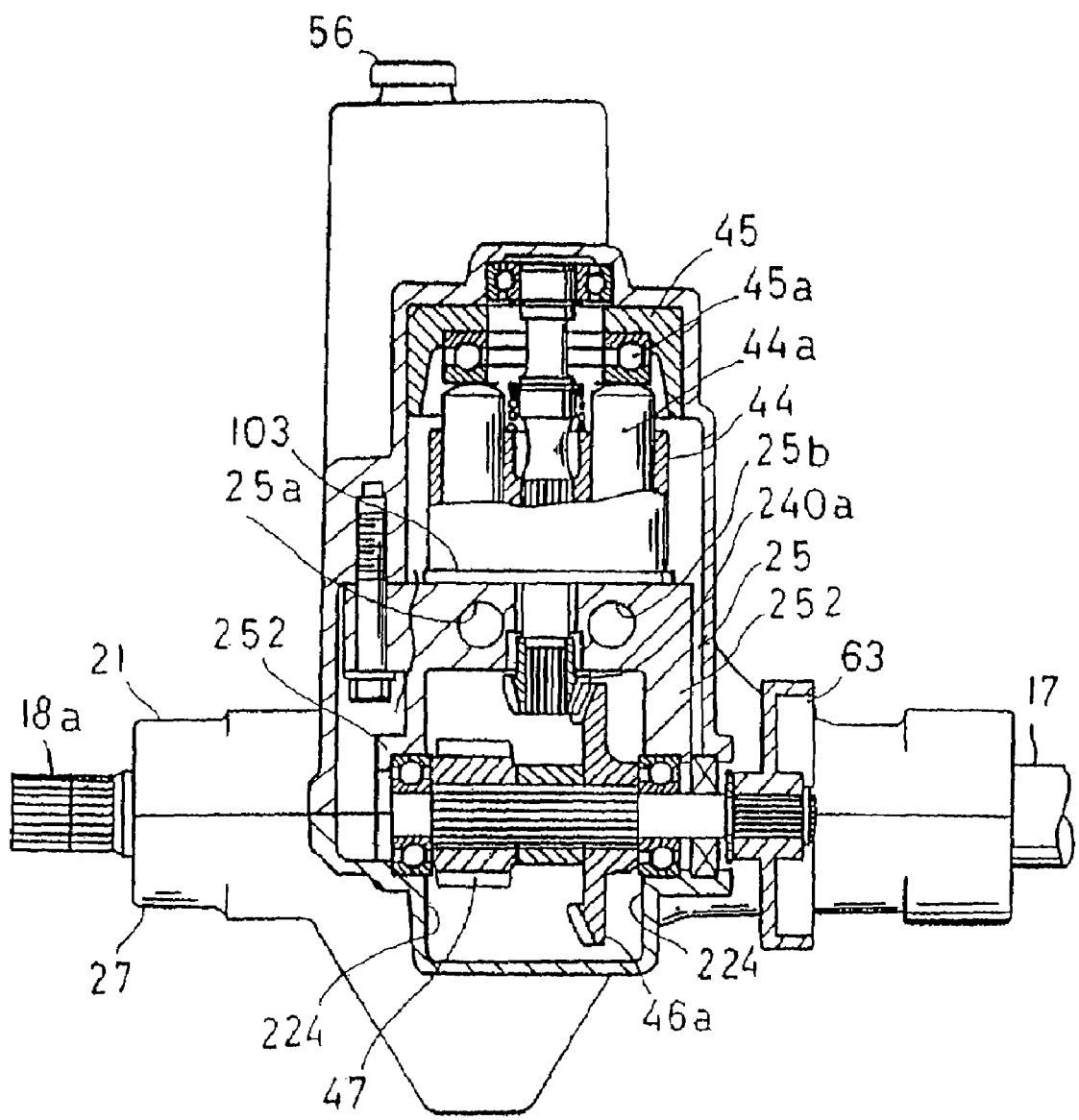
FIG. 25 is a sectional front view taken on the line 25-25 in FIG. 23.

A fifth embodiment of the axle driving unit will be described in accordance with FIGS. 23, 24 and 25. Center section 25, disposed in an elongated enlarged region of the housing, has a substantially flat body. Center section 25 is attached to a side of upper half housing in a substantially horizontal manner. Pump mounting surface 40 and motor mounting surface 41 are formed on upper surface 250 of center section 25; the former is positioned apart from axles 17 and 18 and the latter is positioned near the axles. Pump shaft 29 of the hydraulic pump and motor shaft 24 of the hydraulic motor extend in parallel to each other, and are substantially vertical, being at a right angle to axles 17 and 18.

A pair of kidney-shaped ports 40*a* and 40*b* open at pump mounting surface 40, and a pair of kidney-shaped ports 41*a* and 41b open at motor mounting surface 41 are connected to each other through a pair of straight oil passages 25a and 25b.

Movable swash plate 28 of the hydraulic pump is of a cradle-type, and is manually controllable along the concave circular-arc surface of the inner wall of upper half housing 21 by use of an operating mechanism as in the first embodiment. A fixed swash plate 45 of the hydraulic motor is fixedly fitted into a concave formed at the inner wall of upper half housing 21.

Pump shaft 29 and motor shaft 24 are rotatably supported by bearings longitudinally juxtaposed at upper half housing 21, and bearings longitudinally juxtaposed at center section 25.

A counter shaft 26 is disposed in the same plane as the joint surface of the housing. A pair of bearings for supporting counter shaft 26 are sandwiched between a pair of legs 252 downwardly projecting from the lower surface opposite to motor mounting surface 41, and a pair of legs 224 upwardly projecting from the inner surface of the bottom wall of lower half housing 22 (see FIG. 23). With this construction, there is no need for a bearing holding portion for counter shaft 26 to be provided at the housing. Therefore, the width Wa of the enlarged region can be further restricted (see FIG. 24). One end of counter shaft 26 projects outwardly from the housing for attachment of a braking friction plate 63.

A substantially vertical motor shaft 24 passes downwardly through center section 25. The lower end portion of motor shaft 24 is positioned just above, and at about a right angle to, the axis of the axles (see FIG. 25). A small diameter bevel gear 240a is fixed on the lower end of motor shaft 24, and a larger diameter bevel gear 46a, engageable with bevel gear 240a, is fixed on counter shaft 26, thereby connecting shafts 24 and 26.

A driving force is transmitted from a smaller diameter gear 47 on counter shaft 26 to a ring gear 48 of differential gear 23, differential gear 23 being displaced toward part 18a of axle 18 in the housing. The axes of axles 17 and 18 are positioned in the same plane as the joint surface of the housing. The terminal and bore of first axle 17 are supported only by bearing 100 and bushing 101 interposed between upper half housing 21 and lower half housing 22. Differential gear 23 is eccentrically disposed to further reduce the axial length of part 18a of second axle 18 so that part 18a of second axle 18 is supported by only bushing 101 sandwiched between upper half housing 21 and lower half housing 22.

Figure 26:
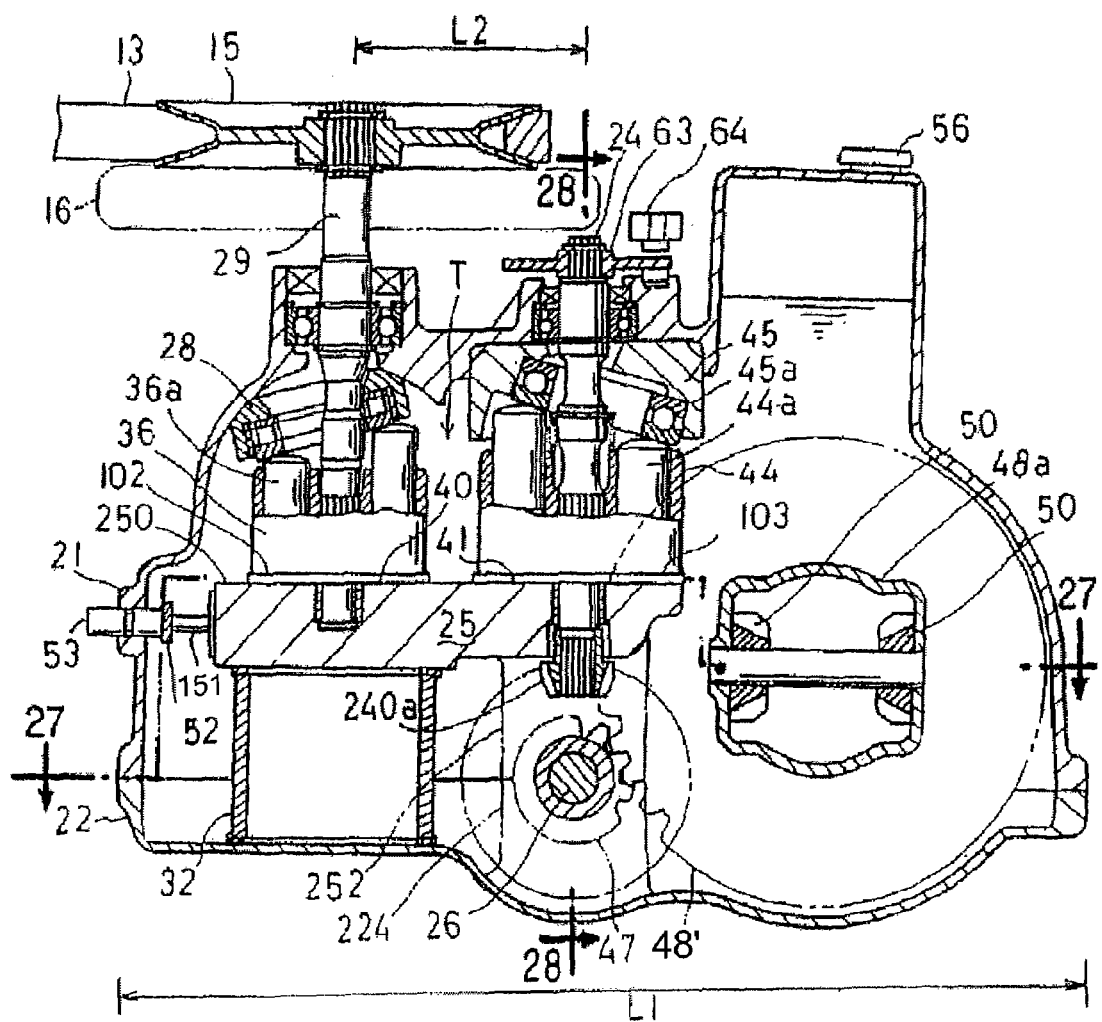
FIG. 26 is a sectional side view of a sixth embodiment of the axle driving unit.
Figure 27:
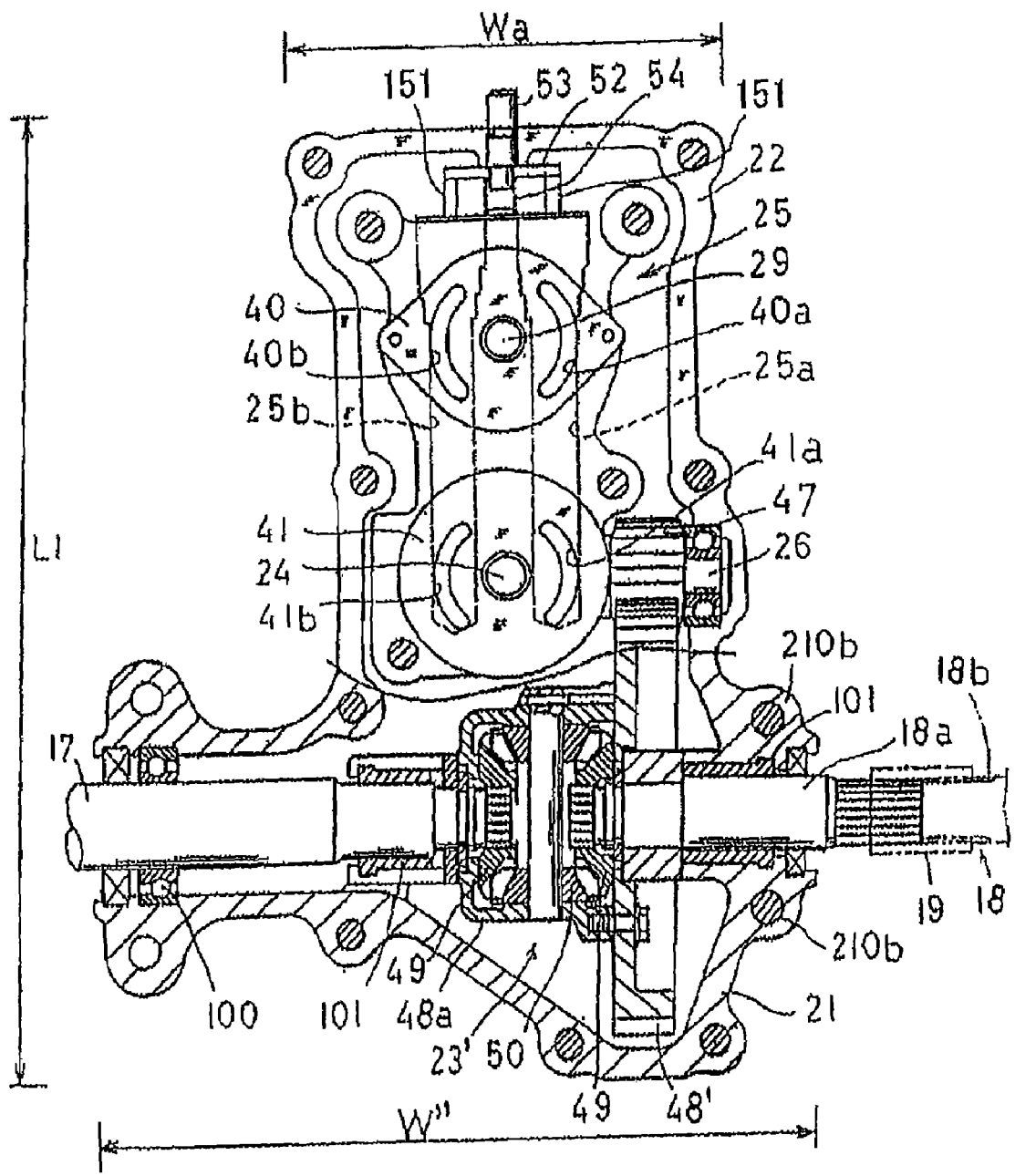
FIG. 27 is a sectional plan view taken on the line 27-27 in FIG. 26.
Figure 28:
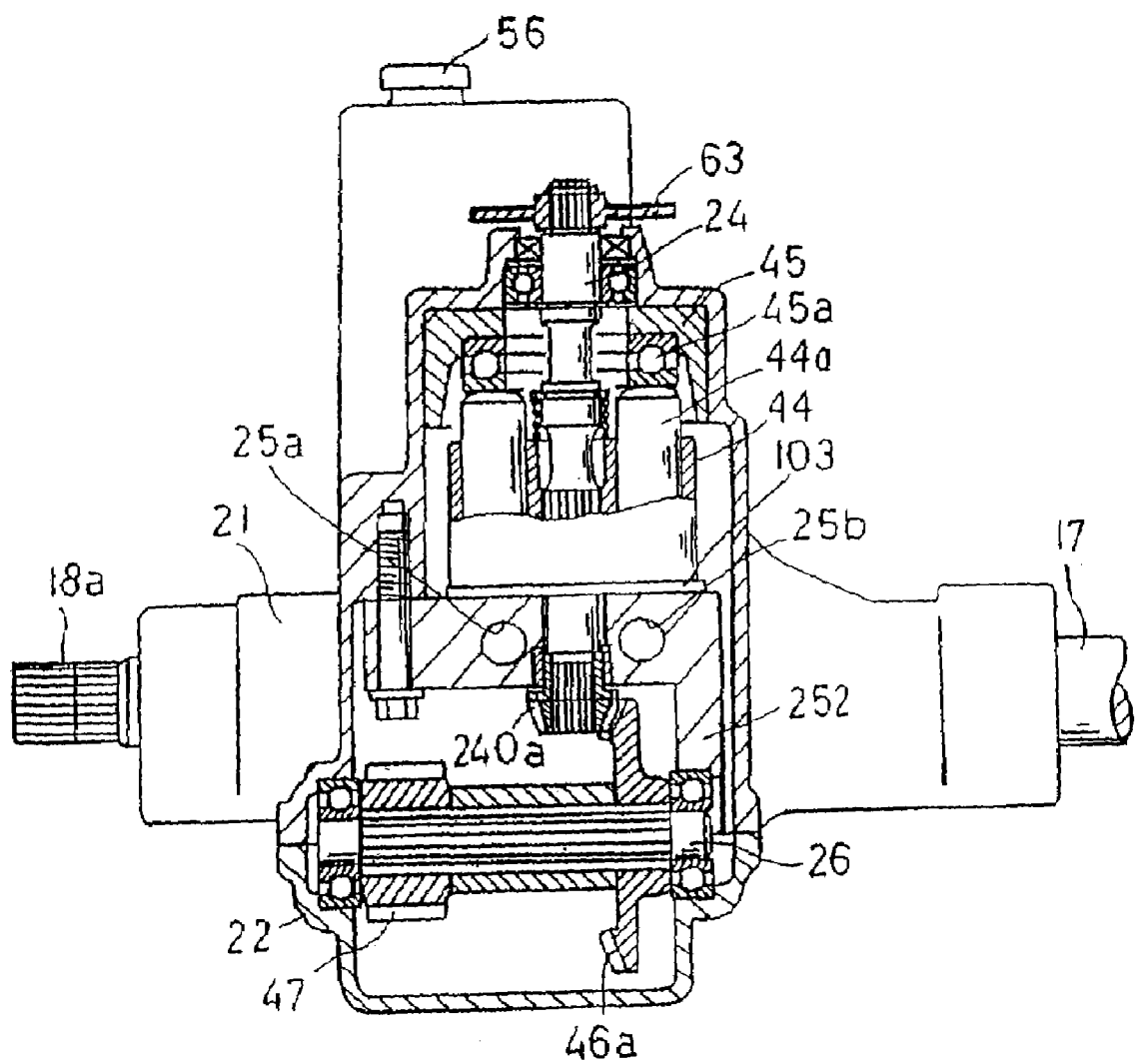
FIG. 28 is a sectional front view taken on the line 28-28 in FIG. 26.

A sixth embodiment of the axle driving unit will be described in accordance with FIGS. 26, 27 and 28. The construction is basically the same as that of the fifth embodiment so that only the following four points are described which are different from that of the fifth embodiment.

A first modified point is the position of braking friction plate 63. The upper end of substantially vertical motor shaft 24 passes through the upper wall of upper half housing 21, and braking friction plate 63 is mounted to this upper end. This allows the braking device to be smaller and more compact because motor shaft 24 has a lower transmitting torque than counter shaft 26. As a result, the axle driving unit becomes smaller in width. Braking friction plate 63 is disposed on the same side as pump shaft 29 that projects from the housing, and is in proximity to cooling fan 16. This enables friction plate 63 to be effectively cooled by the ventilation from cooling fan 16. The ventilation from cooling fan 16 also blows away the dust collected on braking friction plate 63.

A second modified point is with respect to center section 25. One leg 252 downwardly projects from the surface of center section 25 opposite to motor mounting surface 41. Leg 252 and lower half housing 22 support a bearing for the end of counter shaft 26, and a bearing at the other end of counter shaft 26 is sandwiched between upper half housing 21 and lower half housing 22. Leg 252 may be formed separately from center section 25 and fixed below its plane.

A third modified point is with respect to differential gear 23'. An input gear 48' of differential gear 23' is freely fitted on part 18a of second axle 18, and is disposed in proximity to one side wall of the housing, thereby considerably reducing the axial length of part 18a of second axle 18. A differential case 48a is attached to the opposite side wall of the housing. In differential case 48a, the base ends of first axle 17 and part 18a of second axle 18 face each other. Side gears 49 engage with pinions 50 pivoted to the base sides of first axle 17 and part 18a of second axle 18.

A fourth modified point is in the layout of first axle 17 and part 18a of second axle 18 and the construction of the housing support with respect to the joint surface of the housing. The axes of axles 17 and 18 can be disposed in substantially the middle portion of the height of the housing and still retain the balance of the axle driving unit. The protrusion formed in the bottom portion of lower half housing 22 for input gear 48' can thus be made smaller in volume to ensure sufficient height from the ground.

Figure 29:
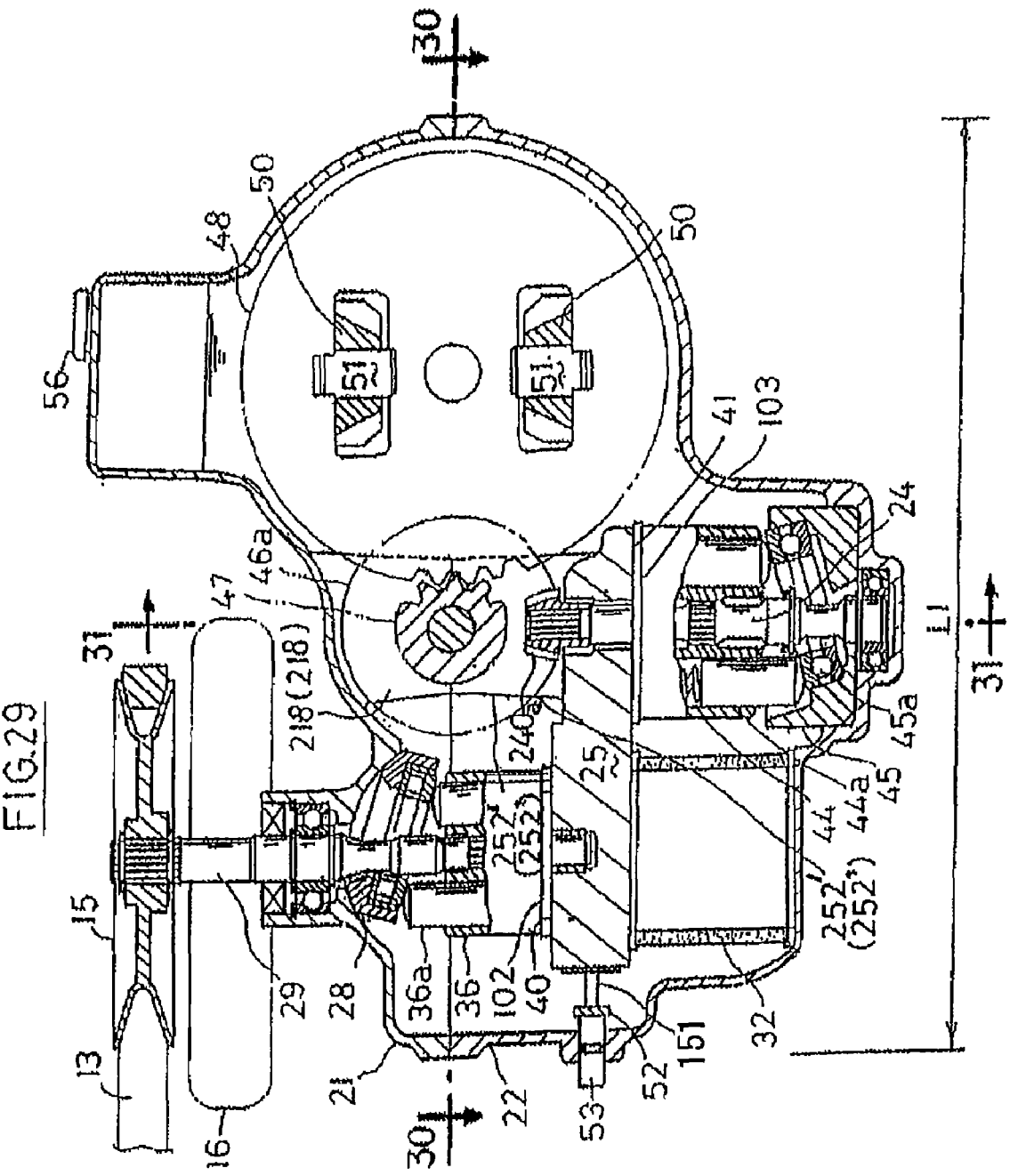
FIG. 29 is a sectional side view of a seventh embodiment of the axle driving unit.
Figure 30:
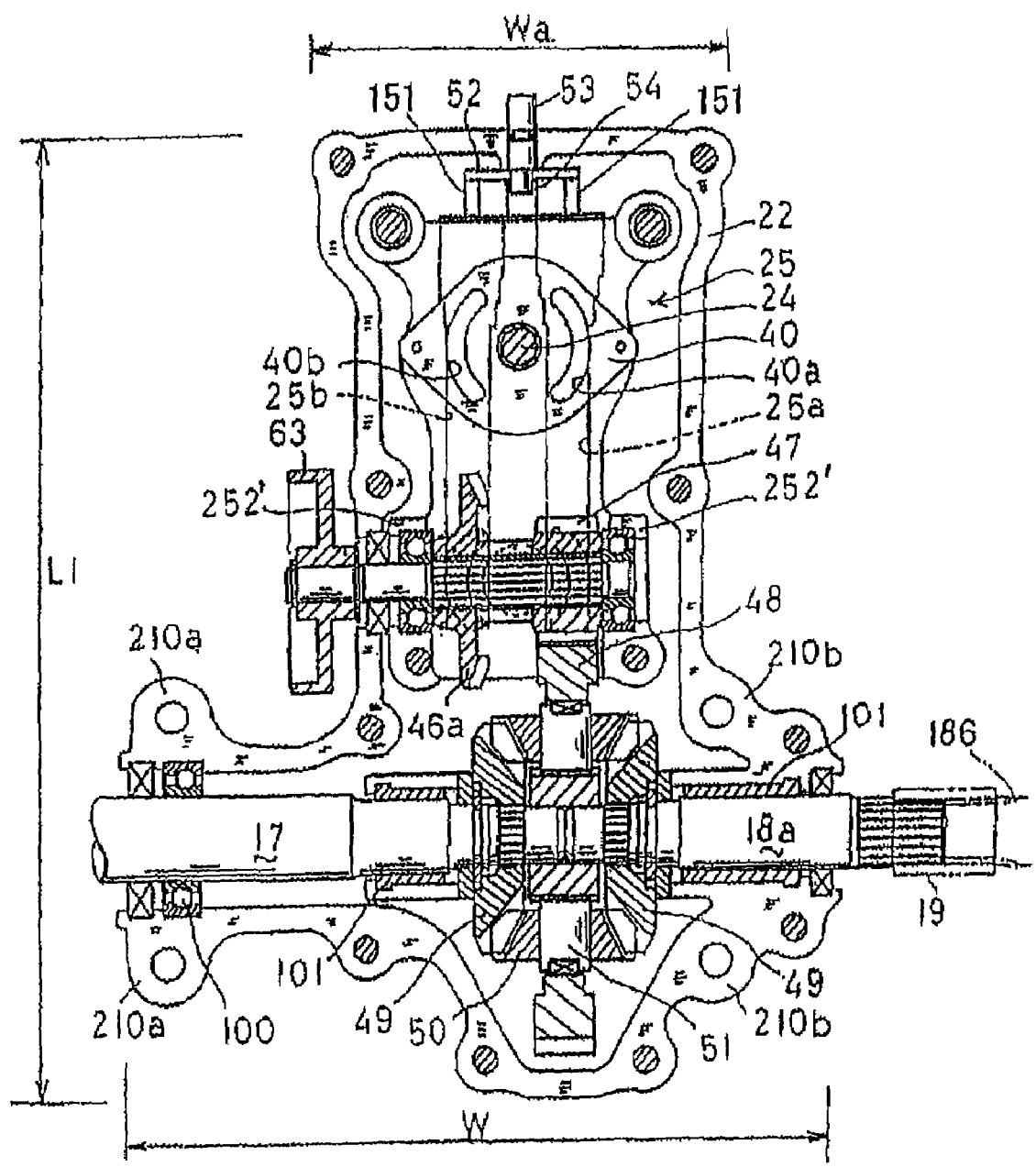
FIG. 30 is a sectional plan view taken on the line 30-30 in FIG. 29.
Figure 31:
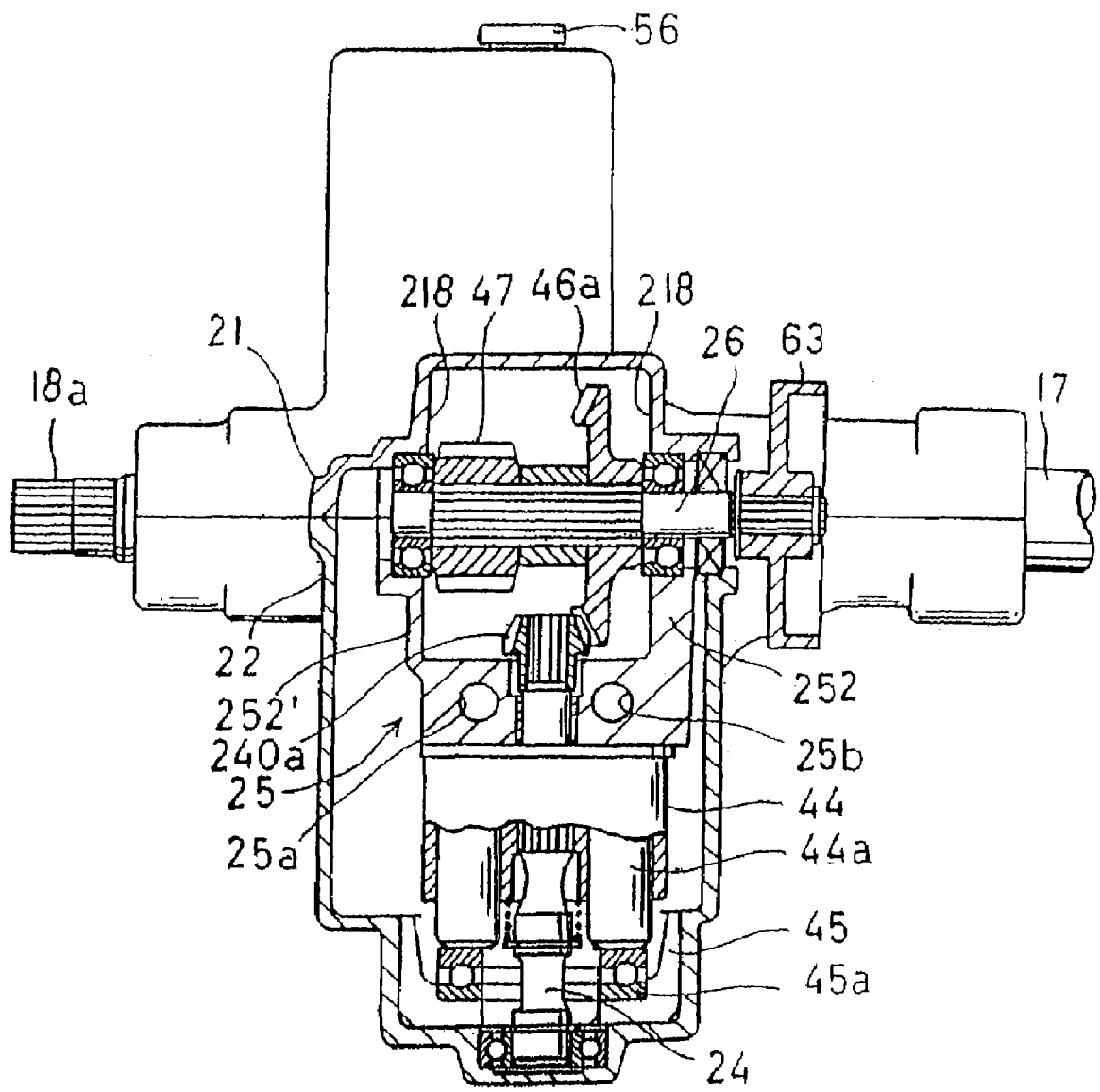
FIG. 31 is a sectional front view taken on the line 31-31 in FIG. 29.

A seventh embodiment of the axle driving unit will be described in accordance with FIGS. 29, 30 and 31.

Center section 25, as in the fifth and sixth embodiments, is substantially shaped like a flat plate, and mounted to upper half housing 21. The body of center section 25 is substantially horizontally disposed in lower half housing 22. Pump mounting surface 40 is formed on the substantially horizontal upper surface of center section 25 spaced apart from axles 17 and 18. Motor mounting surface 41 is formed on the substantially horizontal lower surface of center section 25 in proximity to axles 17 and 18.

Motor shaft 24 of the hydraulic motor is journalled at its upper end to center section 25, and at its lower end to lower half housing 22. If it is difficult to mount the hydraulic motor onto motor mounting surface 41, the lower end of motor shaft 24 may be journalled to a fixed swash plate 45, and fixed swash plate 45 may be connected to the lower surface of center section 25.

Motor shaft 24 extends in parallel to pump shaft 29, and substantially vertically passes through the upper wall of center section 25. On the upper end of motor shaft 24 is fixed a smaller diameter bevel gear 240a engageable with a larger diameter bevel gear 46a on counter shaft 26.

In order to support counter shaft 26 in the same plane as the joint surface of the housing, a pair of bearings is provided between a pair of legs 252', upwardly projecting from the surface of the center section opposite to motor mounting surface 41, and a pair of legs 218 projecting from the inner wall of upper half housing 21.

Although several embodiments have been described, they are merely exemplary of the invention and not to be construed as limiting, the invention being defined solely by the appended claims and their equivalents.

What is claimed is:

1. An axle driving apparatus for a vehicle, comprising:
   an axle;
   a vertical pump shaft;
   a hydraulic pump having a cylinder block engaged with the pump shaft, the cylinder block containing plural reciprocally movable pistons therein, the hydraulic pump including a movable swash plate for receiving thrust from heads of the pistons;
   a pair of trunnion shafts provided coaxially at respective opposite sides of the movable swash plate;

a hydraulic motor driven by pressurized oil from the hydraulic pump and having a motor shaft drivingly connected to the axle; and a housing containing the hydraulic pump, the hydraulic motor, and the axle, the housing including a first housing member and a second housing member separably jointed along a vertical plane perpendicular to a rotary axis of the axle, wherein a rotary axis of the hydraulic pump is substantially parallel to the vertical plane, the hydraulic pump being entirely disposed in the first housing member and the pump shaft extending outwardly from an upper surface of the first housing member, wherein the housing has a horizontal longitudinal length perpendicular to the rotary axis of the axle and has a horizontal lateral width parallel to the rotary axis of the axle, wherein the length is a distance between front and rear ends of the housing, wherein the width is a distance between opposite left and right ends of the housing, the axle projecting outward from one of the opposite left and right ends, wherein the length is greater than the width, wherein the hydraulic pump, the hydraulic motor and the axle are aligned along the horizontal longitudinal length of the housing, so that the hydraulic pump having the vertical pump shaft is disposed in front of the hydraulic motor, and the axle is disposed behind the hydraulic motor, wherein a rotary axis of the trunnion shafts is substantially perpendicular to the vertical plane, wherein one of the trunnion shafts is rotatably supported by the first housing member and the other of the trunnion shafts is rotatably supported by the second housing member, whereby the movable swash plate is slantingly rotatably supported in the housing, wherein one of the trunnion shafts extends outwardly from the housing to be fixed to an arm linked with a speed changing member equipped on the vehicle, and wherein the rotary axis of the motor shaft is lower than a bottom of the cylinder block of the hydraulic pump.

2. The axle driving apparatus for a vehicle according to claim 1, wherein the first housing member includes a horizontal pump mounting surface, wherein the pump mounting surface is disposed lower than the rotary axis of the axle.

3. The axle driving apparatus for a vehicle according to claim 1, wherein the cylinder block has a first end and an opposing second end along a rotary axis thereof, the rotary axis of the trunnion shafts is located substantially between a first horizontal plane located at the first end of the cylinder block and a second horizontal plane located at the second end of the cylinder block.

4. The axle driving apparatus for a vehicle according to claim 3, wherein the movable swash plate includes a contact surface for receiving thrust from the heads of the pistons and an arch shaped portion for holding the contact surface, the trunnion shafts are fixed to respective side surfaces of the arch shaped portion, whereby the contact surface is kept a radial distance from the rotary axis of the trunnion shafts.

5. The axle driving apparatus for a vehicle according to claim 1, wherein the first housing member and the second housing member each have a bore with a bearing member for respectively fitting the trunnion shafts.

6. The axle driving apparatus for a vehicle according to claim 1, wherein opposite sides of the movable swash plate where the respective trunnion shafts are provided include step portions, the first and the second housing members contacting to the step portions, whereby the movable swash plate is prevented from moving toward an axial direction along the rotary axis of the trunnion shafts.

7. The axle driving apparatus for a vehicle according to claim 1, further comprising:

a second axle disposed in the housing;

a differential gear disposed in the housing for differentially connecting the axle and the second axle.

8. The axle driving apparatus for a vehicle according to claim 1, wherein the one of the trunnion shafts extending from the housing is rotatably supported by the second housing member, extends outwardly from the second housing member, and is fixed to the arm.

9. The axle driving apparatus for a vehicle according to claim 1, wherein the trunnion shafts are substantially parallel to the motor shaft.

10. An axle driving apparatus for a vehicle, comprising:

an axle;

a vertical pump shaft;

a hydraulic pump having a cylinder block engaged with the pump shaft, the cylinder block containing plural reciprocally movable pistons therein, the hydraulic pump including a movable swash plate for receiving thrust from heads of the pistons;

a pair of trunnion shafts provided coaxially at respective opposite sides of the movable swash plate;

a hydraulic motor driven by pressurized oil from the hydraulic pump and having a motor shaft drivingly connected to the axle; and a housing containing the hydraulic pump, the hydraulic motor, and the axle, the housing including a first housing member and a second housing member separably jointed along a vertical plane perpendicular to a rotary axis of the axle, wherein a rotary axis of the hydraulic pump is substantially parallel to the vertical plane, the hydraulic pump being entirely disposed in the first housing member and the pump shaft extending outwardly from an upper surface of the first housing member, wherein the housing has a horizontal longitudinal length perpendicular to the rotary axis of the axle and has a horizontal lateral width parallel to the rotary axis of the axle, wherein the length is a distance between front and rear ends of the housing, wherein the width is a distance between opposite left and right ends of the housing, the axle projecting outward from one of the opposite left and right ends, wherein the length is greater than the width, wherein the hydraulic pump, the hydraulic motor and the axle are aligned along the horizontal longitudinal length of the housing, so that the hydraulic pump having the vertical pump shaft is disposed in front of the hydraulic motor, and the axle is disposed behind the hydraulic motor, wherein a rotary axis of the trunnion shafts is substantially perpendicular to the vertical plane, wherein one of the trunnion shafts is rotatably supported by the first housing member and the other of the trunnion shafts is rotatably supported by the second housing member, whereby the movable swash plate is slantingly rotatably supported in the housing, and wherein one of the trunnion shafts extends outwardly from the housing to be fixed to an arm linked with a speed changing member equipped on the vehicle, wherein the motor shaft is parallel to the trunnion shafts and the axle, wherein a rotary axis of the axle is disposed lower than the movable swash plate and higher than a rotary axis of the motor shaft, and wherein the rotary axis of the motor shaft is lower than a bottom of the cylinder block of the hydraulic pump.

11. The axle driving apparatus for a vehicle according to claim 10, wherein the first housing member includes a horizontal pump mounting surface, wherein the pump mounting surface is disposed lower than the rotary axis of the axle.

12. The axle driving apparatus for a vehicle according to claim 10, wherein the cylinder block has a first end and an opposing second end along a rotary axis thereof, the rotary axis of the trunnion shafts is located substantially between a first horizontal plane located at the first end of the cylinder block and a second horizontal plane located at the second end of the cylinder block.

13. The axle driving apparatus for a vehicle according to claim 10, wherein the movable swash plate includes a contact surface for receiving thrust from the heads of the pistons, the contact surface is kept a radial distance from the rotary axis of the trunnion shafts.

14. The axle driving apparatus for a vehicle according to claim 10, wherein the first housing member and the second housing member each have a bore with a bearing member for respectively fitting the trunnion shafts.

15. The axle driving apparatus for a vehicle according to claim 10, wherein opposite sides of the movable swash plate where the respective trunnion shafts are provided include step portions, the first and the second housing members contacting the step portions, whereby the movable swash plate is prevented from moving toward an axial direction along the rotary axis of the trunnion shafts.

16. The axle driving apparatus for a vehicle according to claim 10, further comprising:
a second axle disposed in the housing;
a differential gear disposed in the housing for differentially connecting the axle and the second axle.

17. The axle driving apparatus for a vehicle according to claim 10, wherein the one of the trunnion shafts extending from the housing is rotatably supported by the second housing member, extends outwardly from the second housing member, and is fixed to the arm.

18. An axle driving apparatus for a vehicle, comprising:
an axle;
a vertical pump shaft;
a hydraulic pump having a cylinder block engaged with the pump shaft, the cylinder block containing plural reciprocally movable pistons therein, the hydraulic pump including a movable swash plate for receiving thrust from heads of the pistons;
a pair of trunnion shafts provided coaxially at respective opposite sides of the movable swash plate;
a hydraulic motor driven by pressurized oil from the hydraulic pump and having a motor shaft drivingly connected to the axle; and
a housing containing the hydraulic pump, the hydraulic motor, and the axle, the housing including a first housing member and a second housing member separably jointed along a vertical plane perpendicular to a rotary axis of the axle, wherein a rotary axis of the hydraulic pump is substantially parallel to the vertical plane, the hydraulic pump being entirely disposed in the first housing member and the pump shaft extending outwardly from an upper surface of the first housing member,
wherein the housing has a horizontal longitudinal length perpendicular to the rotary axis of the axle and has a horizontal lateral width parallel to the rotary axis of the axle,
wherein the length is a distance between front and rear ends of the housing,
wherein the width is a distance between opposite left and right ends of the housing, the axle projecting outward from one of the opposite left and right ends,
wherein the length is greater than the width,
wherein the hydraulic pump, the hydraulic motor and the axle are aligned along the horizontal longitudinal length of the housing, so that the hydraulic pump having the vertical pump shaft is disposed in front of the hydraulic motor, and the axle is disposed behind the hydraulic motor,
wherein a rotary axis of the trunnion shafts is substantially perpendicular to the vertical plane, wherein one of the trunnion shafts is rotatably supported by the first housing member and the other of the trunnion shafts is rotatably supported by the second housing member, whereby the movable swash plate is slantingly rotatably supported in the housing, and wherein one of the trunnion shafts extends outwardly from the housing to be fixed to an arm linked with a speed changing member equipped on the vehicle,
wherein the motor shaft is parallel to the trunnion shafts, wherein the first housing member includes a motor mounting surface, a plane located at the motor mounting surface being disposed parallel to the vertical plane, wherein the motor mounting surface faces in a direction opposite of the direction faced by the one of the trunnion shafts extending outwardly from the housing, and
wherein the rotary axis of the motor shaft is lower than a bottom of the cylinder block of the hydraulic pump.

19. The axle driving apparatus for a vehicle according to claim 18, wherein the first housing member includes a horizontal pump mounting surface, wherein the pump mounting surface is disposed lower than the rotary axis of the axle.

20. The axle driving apparatus for a vehicle according to claim 18, wherein the cylinder block has a first end and an opposing second end along a rotary axis thereof, the rotary axis of the trunnion shafts is located substantially between a first horizontal plane located at the first end of the cylinder block and a second horizontal plane located at the second end of the cylinder block.

21. The axle driving apparatus for a vehicle according to claim 18, wherein the movable swash plate includes a contact surface for receiving thrust from the heads of the pistons, the contact surface is kept a radial distance from the rotary axis of the trunnion shafts.

22. The axle driving apparatus for a vehicle according to claim 18, wherein the first housing member and the second housing member each have a bore with a bearing member for respectively fitting the trunnion shafts.

23. The axle driving apparatus for a vehicle according to claim 18, wherein opposite sides of the movable swash plate where the respective trunnion shafts are provided include step portions, the first and the second housing members contacting the step portions, whereby the movable swash plate is prevented from moving toward an axial direction along the rotary axis of the trunnion shafts.

24. The axle driving apparatus for a vehicle according to claim 18, further comprising:
a second axle disposed in the housing;
a differential gear disposed in the housing for differentially connecting the axle and the second axle.

25. An axle driving apparatus for a vehicle comprising:
an axle;
a vertical pump shaft;
a hydraulic pump having a cylinder block engaged with the pump shaft, the cylinder block containing plural reciprocally movable pistons therein, the hydraulic pump including a movable swash plate for receiving thrust from heads of the pistons;
a pair of trunnion shafts provided coaxially at respective opposite sides of the movable swash plate;
a hydraulic motor driven by pressurized oil from the hydraulic pump and having a motor shaft drivingly connected to the axle;

a housing containing the hydraulic pump, the hydraulic motor, and the axle, the housing including a first housing member and a second housing member separably jointed along a vertical plane perpendicular to a rotary axis of the axle, wherein a rotary axis of the hydraulic pump is substantially parallel to the vertical plane, the hydraulic pump being entirely disposed in the first housing member and the pump shaft extending outwardly from an upper surface of the first housing member; and a center section to which the hydraulic pump and motor are mounted, wherein the center section has a projection inserted into a recess formed in a wall of the housing so as to be located in the housing, wherein a rotary axis of the trunnion shafts is substantially perpendicular to the vertical plane, wherein one of the trunnion shafts is rotatably supported by the first housing member and the other of the trunnion shafts is rotatably supported by the second housing member, whereby the movable swash plate is slantingly rotatably supported in the housing, wherein one of the trunnion shafts extends outwardly from the housing to be fixed to an arm linked with a speed changing member equipped on the vehicle, and wherein the rotary axis of the motor shaft is lower than a bottom of the cylinder block of the hydraulic pump.

26. An axle driving apparatus for a vehicle comprising:
an axle;
a vertical pump shaft;
a hydraulic pump having a cylinder block engaged with the pump shaft, the cylinder block containing plural reciprocally movable pistons therein, the hydraulic pump including a movable swash plate for receiving thrust from heads of the pistons;
a pair of trunnion shafts provided coaxially at respective opposite sides of the movable swash plate;
a hydraulic motor driven by pressurized oil from the hydraulic pump and having a motor shaft drivingly connected to the axle;
a housing containing the hydraulic pump, the hydraulic motor, and the axle, the housing including a first housing member and a second housing member separably jointed along a vertical plane perpendicular to a rotary axis of the axle, wherein a rotary axis of the hydraulic pump is substantially parallel to the vertical plane, the hydraulic pump being entirely disposed in the first housing member and the pump shaft extending outwardly from an upper surface of the first housing member; and
a center section to which the hydraulic pump and motor are mounted, wherein the center section has a projection inserted into a recess formed in a wall of the housing so as to be located in the housing,
wherein a rotary axis of the trunnion shafts is substantially perpendicular to the vertical plane, wherein one of the trunnion shafts is rotatably supported by the first housing member and the other of the trunnion shafts is rotatably supported by the second housing member, whereby the movable swash plate is slantingly rotatably supported in the housing, and wherein one of the trunnion shafts extends outwardly from the housing to be fixed to an arm linked with a speed changing member equipped on the vehicle,
wherein the motor shaft is parallel to the trunnion shafts and the axle,
wherein a rotary axis of the axle is disposed lower than the movable swash plate and higher than a rotary axis of the motor shaft, and
wherein the rotary axis of the motor shaft is lower than a bottom of the cylinder block of the hydraulic pump.

27. An axle driving apparatus for a vehicle comprising:
an axle;
a vertical pump shaft;
a hydraulic pump having a cylinder block engaged with the pump shaft, the cylinder block containing plural reciprocally movable pistons therein, the hydraulic pump including a movable swash plate for receiving thrust from heads of the pistons;
a pair of trunnion shafts provided coaxially at respective opposite sides of the movable swash plate;
a hydraulic motor driven by pressurized oil from the hydraulic pump and having a motor shaft drivingly connected to the axle;
a housing containing the hydraulic pump, the hydraulic motor, and the axle, the housing including a first housing member and a second housing member separably jointed along a vertical plane perpendicular to a rotary axis of the axle, wherein a rotary axis of the hydraulic pump is substantially parallel to the vertical plane, the hydraulic pump being entirely disposed in the first housing member and the pump shaft extending outwardly from an upper surface of the first housing member; and
a center section to which the hydraulic pump and motor are mounted, wherein the center section has a projection inserted into a recess formed in a wall of the housing so as to be located in the housing,
wherein a rotary axis of the trunnion shafts is substantially perpendicular to the vertical plane, wherein one of the trunnion shafts is rotatably supported by the first housing member and the other of the trunnion shafts is rotatably supported by the second housing member, whereby the movable swash plate is slantingly rotatably supported in the housing, and wherein one of the trunnion shafts extends outwardly from the housing to be fixed to an arm linked with a speed changing member equipped on the vehicle,
wherein the motor shaft is parallel to the trunnion shafts, wherein the first housing member includes a motor mounting surface, a plane located at the motor mounting surface being disposed parallel to the vertical plane, wherein the motor mounting surface faces in a direction opposite of the direction faced by the one of the trunnion shafts extending outwardly from the housing, and
wherein the rotary axis of the motor shaft is lower than a bottom of the cylinder block of the hydraulic pump.

28. An axle driving apparatus for a vehicle comprising:
a housing;
an axle disposed within the housing;
a hydrostatic transmission disposed within the housing for driving the axle, the hydrostatic transmission including a hydraulic pump having a movable swash plate, a hydraulic motor, and a center section having a pump mounting surface and a motor mounting surface for mounting the hydraulic pump and the hydraulic motor at right angles to each other, wherein the center section has a projection inserted into a recess formed in a wall of the housing so as to be located in the housing; and
a pair of shafts projecting from both side surfaces of the movable swash plate positioned on an axis of slanting movement of the movable swash plate, wherein each of the shafts is parallel to a motor shaft and is rotatably supported by the housing,
wherein one of the shafts extends outwardly from the housing to be fixed to an arm linked with a speed changing member equipped on the vehicle, and
wherein the rotary axis of the motor shaft is lower than a bottom of the cylinder block of the hydraulic pump.

* * * * *